(12) United States Patent
Miyazawa et al.

(10) Patent No.: US 12,011,818 B2
(45) Date of Patent: Jun. 18, 2024

(54) ELECTRIC TOOL

(71) Applicant: Koki Holdings Co., Ltd., Tokyo (JP)

(72) Inventors: Ken Miyazawa, Ibaraki (JP); Ryo Suzuki, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 752 days.

(21) Appl. No.: 17/256,635

(22) PCT Filed: Apr. 12, 2019

(86) PCT No.: PCT/JP2019/015940
§ 371 (c)(1),
(2) Date: Dec. 28, 2020

(87) PCT Pub. No.: WO2020/003696
PCT Pub. Date: Jan. 2, 2020

(65) Prior Publication Data
US 2021/0260745 A1 Aug. 26, 2021

(30) Foreign Application Priority Data

Jun. 29, 2018 (JP) .................................. 2018-124317
Jun. 29, 2018 (JP) .................................. 2018-124333

(51) Int. Cl.
*H02K 9/06* (2006.01)
*B24B 23/02* (2006.01)
(Continued)

(52) U.S. Cl.
CPC ............ *B25F 5/008* (2013.01); *B24B 23/028* (2013.01); *H02K 9/06* (2013.01); *H02K 15/02* (2013.01)

(58) Field of Classification Search
CPC ......... B25F 5/008; B24B 23/028; H02K 9/06; H02K 15/02
(Continued)

(56) References Cited

U.S. PATENT DOCUMENTS

2010/0170538 A1 7/2010 Baker et al.

FOREIGN PATENT DOCUMENTS

| CN | 101656454 | 2/2010 |
|---|---|---|
| CN | 205237765 | 5/2016 |

(Continued)

OTHER PUBLICATIONS

Machine translation of DE102015225748; Stierle et al. (Year: 2017).*

(Continued)

*Primary Examiner* — Terrance L Kenerly
(74) *Attorney, Agent, or Firm* — JCIPRNET

(57) ABSTRACT

An electric tool is provided which enables preventing adherence to a rotor core of dust, such as iron powder, that has entered a motor. The electric tool includes a cylindrical motor housing 10 accommodating and supporting the motor, and a cooling fan attached to a rotation shaft of the motor, and cools the motor by flowing air generated by the cooling fan toward the back or front of the motor housing 10, wherein a fan guide 50 guiding cooling air is provided in front of an insulator 35 of a stator 30 of the motor. The fan guide 50 includes a first cylindrical part 51 which covers a rotation space of the cooling fan, a guide surface 53, and a second cylinder 55 which extends backward from the guide surface 53, wherein a labyrinth space 39 is formed by the insulator 35 and the second cylinder 55. By providing the labyrinth space 39, it is possible to block the flow of cooling air from the outer peripheral side of the stator 30 to an opening 53*a*.

14 Claims, 15 Drawing Sheets

(51) Int. Cl.
*B25F 5/00* (2006.01)
*H02K 15/02* (2006.01)

(58) Field of Classification Search
USPC .......................................................... 310/50
See application file for complete search history.

(56) References Cited

FOREIGN PATENT DOCUMENTS

| | | | | |
|---|---|---|---|---|
| CN | 205466045 | | 8/2016 | |
| CN | 106470804 | | 3/2017 | |
| DE | 102008009277 A1 * | 8/2009 | ........... B24B 23/028 |
| DE | 102015225748 A1 * | 6/2017 | |
| JP | S47029684 | | 12/1972 | |
| JP | S52144867 | | 11/1977 | |
| JP | 2006055757 | | 3/2006 | |
| JP | 2012061552 | | 3/2012 | |
| JP | 2013031901 | | 2/2013 | |
| JP | 2015123515 | | 7/2015 | |
| JP | 2015174202 | | 10/2015 | |
| JP | 2019042891 | | 3/2019 | |
| WO | 2017150030 | | 9/2017 | |
| WO | 2020003696 | | 1/2020 | |

OTHER PUBLICATIONS

Machine translation of DE102008009277; Stierle et al. (Year: 2008).*
"Search Report of Europe Counterpart Application", dated Nov. 3, 2021, p. 1-p. 12.
"International Search Report (Form PCT/ISA/210)" of PCT/JP2019/015940, dated Jul. 9, 2019, with English translation thereof, pp. 1-8.
"Partial supplementary search report of Europe Counterpart Application," dated Jul. 30, 2021, p. 1-13.
"Office Action of Japan Counterpart Application", dated Oct. 31, 2023, with English translation thereof, p. 1-p. 9.
"Office Action of Europe Counterpart Application, Application No. 19826894.8", dated Dec. 8, 2023, p. 1-p. 5.
"Office Action of China Counterpart Application", issued on Feb. 26, 2024, with English translation thereof, pp. 1-11.

* cited by examiner

ELECTRIC TOOL

CROSS-REFERENCE TO RELATED APPLICATION

This application is a 371 application of the International PCT application serial no. PCT/JP2019/015940, filed on Apr. 12, 2019, which claims the priority benefits of Japan Patent Application No. 2018-124317, filed on Jun. 29, 2018, and Japan Patent Application No. 2018-124333, filed on Jun. 29, 2018. The entirety of each of the above-mentioned patent applications is hereby incorporated by reference herein and made a part of this specification.

TECHNICAL FIELD

The present invention relates to an electric tool such as a disc grinder.

RELATED ART

In an electric tool having various working modes, it is important to provide operability corresponding thereto. In a portable electric tool such as a disc grinder, a handle connected so as to protrude backward from a motor housing that holds a motor is provided. An operator grips the handle with one hand, and carries out work such as grinding, polishing and cutting while holding, with the other hand, the motor housing itself or a side handle attached to the motor housing. A configuration of such a grinder is known from Patent Document 1. The disc grinder has a housing made of metal or synthetic resin. For a large disc grinder of medium or larger size, since the size or output of the motor increases, in Patent Document 1, a cylindrical integrally molded article is used as the motor housing, and a housing shape with high rigidity is achieved. A left-right split type handle housing that is split by a section including a longitudinal axis is connected to a back side of the motor housing. In order to perform polishing using the disc grinder, a grindstone is attached, an annular surface of the disc-shaped grindstone is pressed against a surface to be polished, and the work is performed. On the other hand, in order to perform cutting using the disc grinder, a rotary blade is attached, and the work is performed while pressing a disc-shaped surface of the rotary blade so that the surface is orthogonal to a surface of a material to be polished.

PRIOR-ART DOCUMENTS

Patent Documents

Patent Document 1: Japanese Patent Laid-open No. 2012-61552

SUMMARY OF THE INVENTION

Problems to be Solved by the Invention

In the conventional electric tool as described in Patent Document 1, inside the motor housing, a cooling fan that can be attached to a rotation shaft of the motor is provided, and a heat generating portion is cooled by sucking outside air and sending cooling air to the motor. The cooling air is configured to flow in an axial direction on an outer peripheral side of a stator and in a space between a rotor and the stator. For this reason, it is possible to efficiently cool an outer peripheral surface of the stator. However, on the other hand, there is a risk that direct cooling performance for an inner portion of the stator, particularly a coil, may be insufficient. In the case of using a brushless motor, since a permanent magnet is used for a rotor core, there is a risk that metal powder or the like may adhere to the rotor core, and a problem may arise that metal powder or the like adsorbed on the rotor core is difficult to remove when the cooling air has a small air volume or low air velocity.

In recent years, electric tools tend to be smaller and lighter by adopting a brushless DC motor. There is also a tendency for the electric tools to further increase the output. The brushless DC motor is driven by using an inverter circuit using a semiconductor switching element. As the semiconductor switching element used in the inverter circuit, a field effect transistor (FET) or insulated-gate bipolar transistor (IGBT) may be used. Since these electronic elements generate a large amount of heat, sufficient cooling is necessary. In the electric tool of Patent Document 1, since the cooling air flows on the outer peripheral side of the stator and the space between the rotor and the stator, it will be possible to cool the outer peripheral surface of the stator; on the other hand, there is a risk that the cooling performance for the inside of the stator, particularly for the coil, may be insufficient. In addition, in a polishing device such as a grinder, since it is used in an environment where polished metal powder scatters, there is a risk that the metal powder may be sucked together with the cooling air and enter the housing. In that case, if the air volume of the cooling air passing through the inner portion of a core of the stator is small, there is a risk that dust or the like may be adsorbed by the rotor having the permanent magnet and may not be removed. In order to solve this problem, it is conceivable to increase the air volume of the cooling air. However, the size of the cooling fan that can be used may be limited by the size of the motor housing. In addition, since the cooling fan is attached to the rotation shaft of the motor and rotates in synchronization with the motor, a rotational speed of the cooling fan cannot be increased. It is also conceivable to provide at an intake port of the housing a filter that suppresses intrusion of dust. However, depending on the working mode, a large amount of dust may adhere to the filter in a short time. Therefore, it is necessary to devise a method for easily removing the dust adhering to the filter. For example, it is conceivable to provide a structure in which the filter is not screwed and a tool for attachment and detachment is not required. However, depending on the toolless attachment and detachment structure, there is a possibility that the filter may easily come off due to external impact or the like, or the filter and a part of an attachment and detachment mechanism may enter a main body and affect the arrangement of the internal configuration, insulation distance, or the like.

The present invention has been made in view of the above background, and an object of the present invention is to provide an electric tool with improved cooling performance of a motor, particularly, with improved cooling performance for an inner peripheral side of a stator. Another object of the present invention is to improve the cooling performance of a specific place in the motor by changing the shapes of an insulator and a fan guide of an existing motor. Still another object of the present invention is to provide an electric tool capable of preventing dust such as iron powder that has entered the motor from adhering to a rotor core.

Means for Solving the Problems

Representative features of the present invention disclosed herein will be described as follows. According to one feature of the present invention, an electric tool has: a motor, having a stator and a rotor located inside the stator; a motor housing of a cylindrical shape, accommodating and supporting the motor; a cooling fan attached to a rotation shaft of the motor and rotating in synchronization with the motor; and a power transmission mechanism transmitting rotational force of the motor to a tip tool. The motor is cooled by flowing air generated by the cooling fan from an opening on one side of the motor housing toward an opening on the other side of the motor housing. A fan guide may be provided, guiding cooling air generated by the cooling fan from an intake port to an exhaust port, and the fan guide may guide the cooling air to concentrate inside the stator. In addition, the electric tool has: a handle housing connected to one side of the motor housing, in which a grip is formed; a gear case connected to the other side of the motor housing; and a drive circuit mounted with a switching element and driving the motor, and is configured as follows. The intake port is provided in the handle housing. The exhaust port is provided in the gear case. When the cooling fan rotates, the air is sucked into the handle housing from the intake port, the air passes through inside of the motor housing, cools the drive circuit and then cools the motor, and is discharged outside from the exhaust port.

According to another feature of the present invention, the stator has a nonmagnetic insulator at both ends of a stator core, and the fan guide guides the cooling air by engaging with one insulator in a concavo-convex manner in an axial direction. In addition, the concavo-convex engagement includes a cylindrical part continuous in a circumferential direction on a back surface side of the fan guide, and a circumferential groove formed on a front surface side of the insulator and continuous in the circumferential direction. The cylindrical part and the circumferential groove are disposed so as to overlap each other in a non-contact state in the axial direction of the motor. Further, the fan guide has an abutment part abutting against an end surface of the stator core of the stator, and the abutment part is configured to suppress the stator from moving in the axial direction.

According to still another feature of the present invention, the abutment part is a convex part extending in the axial direction from multiple places in the fan guide in the circumferential direction, and the convex part abuts against the stator core. In addition, the intake port, the exhaust port and the motor are separated from each other in the axial direction of the motor, and the motor is disposed to be located between the intake port and the exhaust port. Further, in the rotor, multiple slots continuous in a direction of the rotation shaft are provided in a rotor core composed of a laminated iron core attached to the rotation shaft and a permanent magnet is accommodated. On an outer peripheral surface of the rotor core, a concave part recessed inward is formed so as to be continuous in the axial direction, and the cooling air is also configured to pass through inside the concave part.

Effects of the Invention

According to the present invention, the cooling air can concentratedly flow into an inner space of the stator, and sufficient cooling performance of a coil as a heating source can be ensured. In addition, by slightly changing the shape of the insulator on one side of the motor and the shape of the fan guide, a labyrinth structure being a characteristic configuration of the present invention is realized. Thus, there is almost no increase in the manufacturing cost of the electric tool, and the present invention can be easily realized without changing the configuration of a conventional electric tool.

BRIEF DESCRIPTION OF THE DRAWINGS

FIG. 7A to FIG. 7D illustrate the filter member 150 of FIG. 5, in which FIG. 7A is a side view, FIG. 7B is a top view, FIG. 7C is a front view, and FIG. 7D is a back view.

DESCRIPTION OF THE EMBODIMENTS

Embodiment 1

Figure 1:
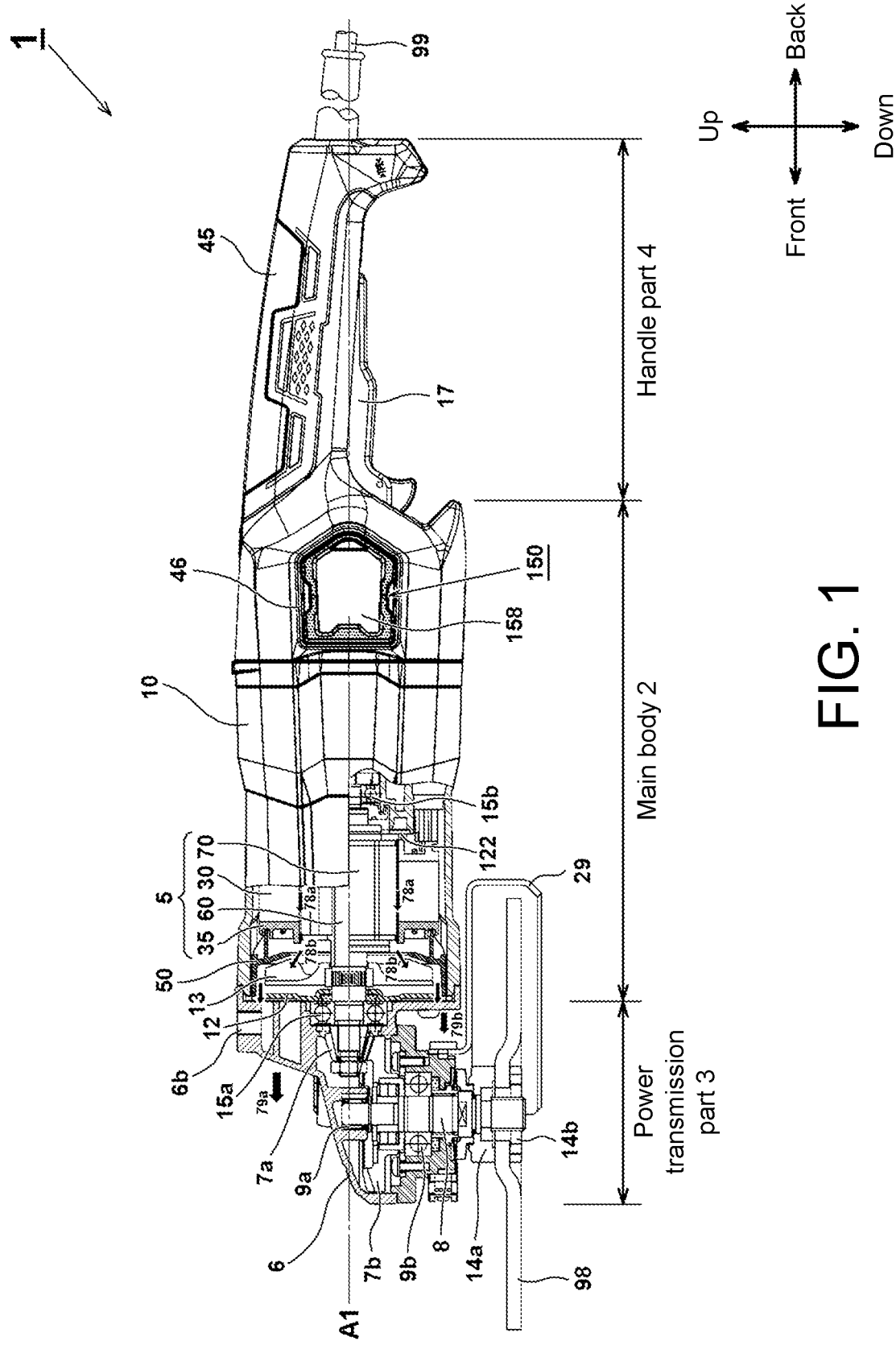
FIG. 1 is a side view (partial longitudinal sectional view) of a disc grinder 1 being an electric tool according to an embodiment of the present invention.

Hereinafter, embodiments of the present invention will be described in detail with reference to the drawings. In all the drawings for describing the embodiments, members having the same functions are denoted by the same reference numerals, and description thereof will not be repeated. In addition, in this specification, the front-back, left-right, and up-down directions are described as the directions shown in the drawings.

FIG. 1 is a side view (partial longitudinal sectional view) of a disc grinder 1 being an electric tool according to an embodiment of the present invention. The disc grinder 1 is configured by having: a main body 2 in which a motor 5 as a driving source or a control part such an inverter circuit is accommodated inside a cylindrical motor housing 10; a power transmission part 3 operating a working device (herein, a grinder using a grindstone 98 as a tip tool) driven by the motor 5; and a handle part 4 provided on a back side of the main body 2 for being gripped by an operator. The handle part 4 is provided on the back side of the cylindrical main body 2 so as to extend coaxially with the main body 2, and is a portion to be gripped by the operator with one hand.

A housing of the disc grinder 1 is composed of three portions, i.e., the cylindrical motor housing 10, a gear case 6 provided on the front side thereof, and a handle housing 45 provided on the back side thereof. The motor 5 of a brushless type is accommodated inside the motor housing 10. In the motor 5, a rotor 70 having a permanent magnet is disposed on an inner peripheral side and a stator 30 having a coil is provided on an outer peripheral side. A rotation shaft 60 of the motor 5 is rotatably held by a bearing 15b provided in the vicinity of a central part of the motor housing 10 and a bearing 15a on the front side that is held by the gear case 6 covering a front opening of the motor housing 10. The power transmission part 3 includes the disc-shaped grindstone 98 attached to a spindle 8 axially supported by bearings 9a and 9b in the gear case 6, and a wheel guard 29. A pair of bevel gears 7a and 7b are disposed in the gear case 6, changing direction of a rotational force of the rotation shaft 60 of the motor 5 and transmitting it to the spindle 8. At a lower end of the spindle 8, a tip tool holding part is formed by a presser fitting 14b via a bracket 14a, and the grindstone 98 is fixed. A side handle attachment hole 6b is provided in an upper part of the gear case 6, and similar side handle attachment holes 6a and 6c (to be described later in FIG. 2) are provided on a right side surface and a left side surface of the gear case 6.

A cooling fan 13 is provided on the front side of the motor 5 and between the motor 5 and the bearing 15a. The cooling fan 13 is a centrifugal fan, sucking the air on the motor 5 side and discharging it radially outward. Behind the cooling fan 13, a fan guide 50 is provided which forms a through hole of a predetermined size around the rotation shaft 60 and forms an air inlet for the cooling fan. By an airflow generated by rotation of the cooling fan 13, the air taken in from an intake port (to be described later in FIG. 9) provided in a filter attachment part 46 provided on a side surface of the handle housing 45 is sucked into the housing and a flow of air (airflow) from the back side to the front side of the motor 5 is generated. A filter member 150 using a net 158 is attached to the filter attachment part 46 provided in two places respectively on left and right side surfaces of the handle housing 45, and is configured so that dust or the like does not enter the housing via the intake port when outside air is taken in. The filter member 150 is provided on the filter attachment part 46, the airflow cools a heat generating member such as a control circuit disposed adjacent to the inside of the filter attachment part 46, and flows into the motor housing 10 side via an inverter circuit part to be described later.

The airflow that has reached the motor 5 side flows so as to pass between the rotor 70 and the stator 30, as shown by an arrow 78a. Although not visible in FIG. 1, on a core of the stator 30, multiple teeth are formed protruding radially inward from a cylindrical outer periphery, and a coil is wound around the teeth. Since the cooling air flows in the axial direction through a space between these coils, the air flows not only through a portion along an outer peripheral surface of the rotor 70 as shown by the arrow 78a in FIG. 1 but also inside the stator core. The cooling air that has passed through the inside of the motor 5 from the back side to the front side in the axial direction is sucked from the vicinity of an axial center of the cooling fan 13 as shown by an arrow 78b, is discharged radially outward by rotation of the cooling fan 13, and passes through an air hole formed on an outer peripheral side of a bearing holding plate 12. A part of the cooling air discharged from the bearing holding plate 12 is discharged outside as shown by an arrow 79a via an exhaust port (to be described later in FIG. 2) formed in the gear case 6, and the remainder is discharged outside as shown by an arrow 79b via an exhaust port (not shown) in the vicinity of a lower side of the bearing holding plate 12. As described above, in the present embodiment, by introducing the cooling air from an opening on the back side of the cylindrical motor housing 10 toward the front in the axial direction, and discharging it from an opening on the front side to the gear case 6 side, a flow of cooling air in a direction along a rotation axis A1 may be generated, and a heat generating portion such as the motor 5 or the inverter circuit (to be described later) is efficiently cooled.

The handle housing 45 forms the handle part 4 being a portion to be gripped by the operator during work. The housing body is split into left and right parts by molding of plastic, and is fixed by four screws (not shown). A power cord 99 for supplying commercial AC power is connected to a back end side of the handle part 4. Below the handle housing 45, a trigger lever 17 for controlling on/off of the motor 5 is provided.

Figure 2:
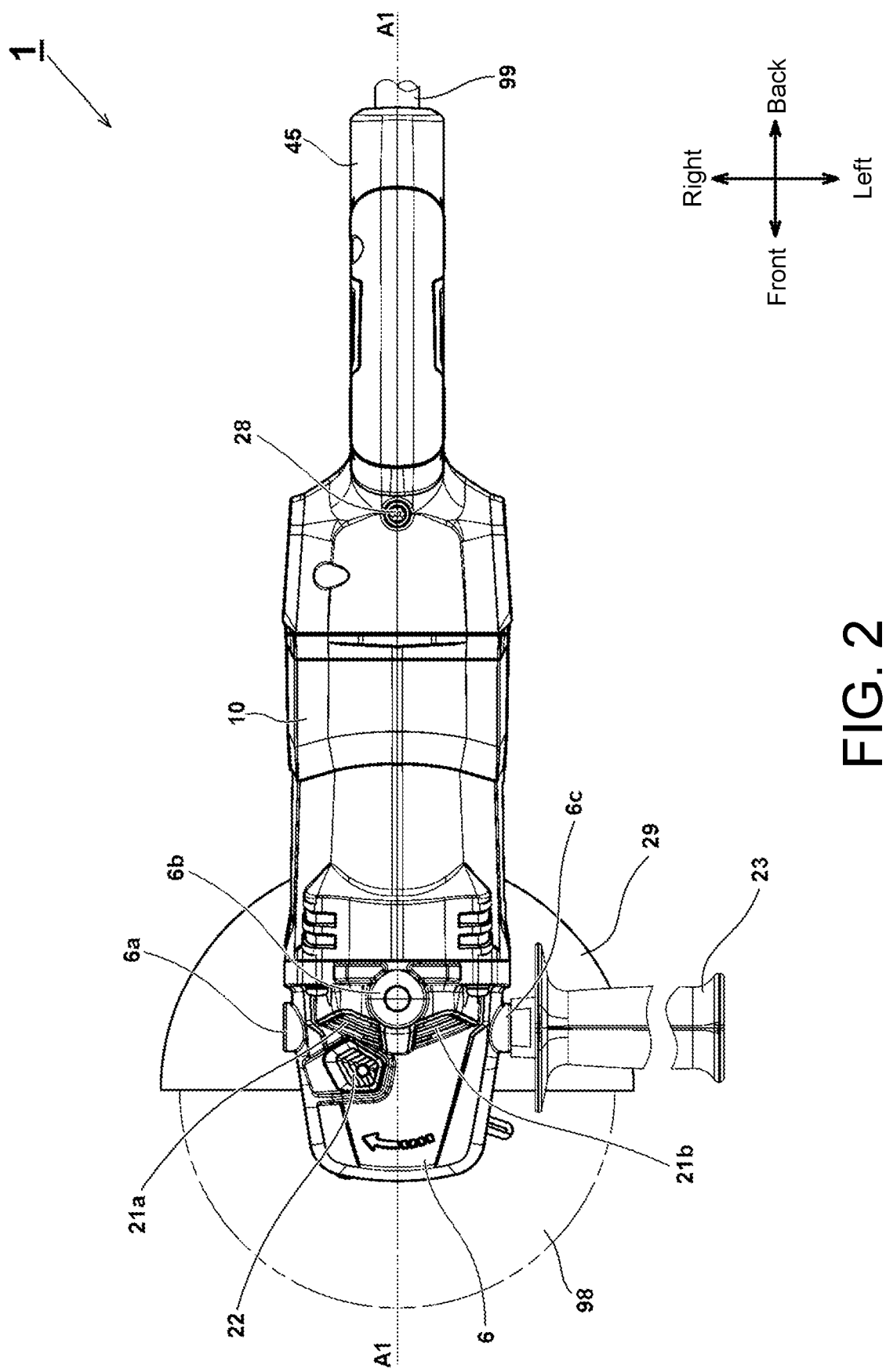
FIG. 2 is a top view of the disc grinder 1 according to an embodiment of the present invention.

FIG. 2 is a top view of the disc grinder 1 according to an embodiment of the present invention. The shape of the motor housing 10 is a cylindrical shape which is almost the same as that in the side view of FIG. 1. The handle part of the handle housing 45 is disposed in a line in the longitudinal direction of the motor housing 10 so as to substantially coincide with the rotation axis A1 of the motor 5. Two exhaust ports 21a and 21b are provided in the upper part of the gear case 6. The side handle attachment holes 6a to 6c for attaching a side handle 23 are formed respectively on the right side surface, an upper surface and the left side surface of the gear case 6. FIG. 2 shows a state in which the side handle 23 is attached to the side handle attachment hole 6c on the left side. On the front side of the exhaust port 21a, an operation part (spindle lock button 22) of a spindle lock that locks the spindle 8 from rotation when the tip tool such as the grindstone 98 is attached or removed is provided. An LED 28 is provided on an upper surface of the handle housing 45 and on the front side of the portion gripped by the operator. The LED 28 is a lighting means for indicating whether the power of the disc grinder 1 is on or off, and for indicating the occurrence of an abnormal operation. When some kind of abnormality occurs, a flasher light of the LED notifies the occurrence of the abnormality.

Figure 3:
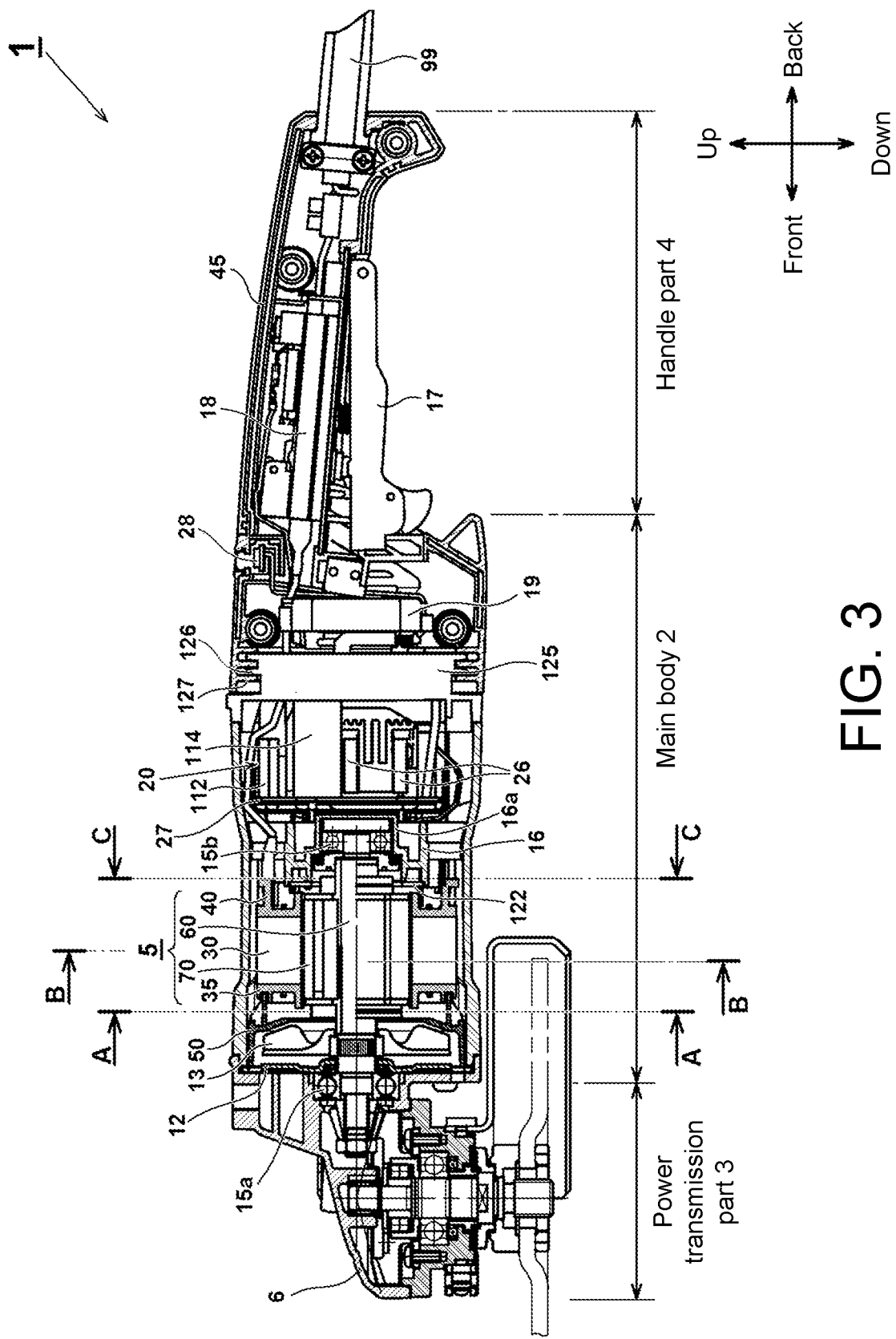
FIG. 3 is a longitudinal sectional view of the disc grinder 1 according to an embodiment of the present invention.

FIG. 3 is a longitudinal sectional view of the disc grinder 1 according to an embodiment of the present invention. The motor housing 10 has an integral configuration made of synthetic resin, has an opening part on the front side and the back side, and a bearing holder 16 for fixing the bearing 15b is provided in the vicinity of the center. In the bearing holder 16, a cylindrical surface for holding the bearing 15b is formed in the center of a lattice-like, rib-shaped portion that allows air to penetrate in the axial direction. From the opening on the back end side of the motor housing 10, the inverter circuit part 20 is inserted, and then the opening portion is covered by an opening holding part 125. The handle housing 45 is configured to be splittable in the left-right direction, and is fixed so as to sandwich the opening holding part 125 between the left and right split pieces. On an outer peripheral surface of the opening holding part 125, two flanges 126 are formed protruding in the radial direction. On an inner peripheral surface of the handle housing 45 along the flanges 126, a circumferential groove part 127 is formed continuous in a circumferential direction.

A circuit board 27 mounted with the inverter circuit part 20 is an annular multi-layer board, and is disposed so that its surface is orthogonal to the rotation axis A1 of the motor 5. On the circuit board 27, switching elements (to be described later) such as six insulated gate bipolar transistors (IGBT 26) that constitute an inverter circuit are mounted. A small annular sensor substrate 122 is mounted between the bearing 15b and the stator 30 as viewed in the direction of the rotation axis A1. Three Hall ICs 121 (to be described later in FIG. 4) for directly detecting a magnetic field generated by the rotor 70 are mounted on the sensor substrate 122 at intervals of 60 degrees. While the Hall ICs 121 are mounted on a front side surface of the sensor substrate 122 facing the rotor 70 side, they may also be mounted on a surface (counter-motor surface) of the sensor substrate 122 on the opposite side from the rotor 70.

A control circuit part 19 is accommodated behind the opening holding part 125. The control circuit part 19 is disposed so as to extend in a direction orthogonal to the rotation axis A1, and is fixed by being sandwiched by the handle housing 45 configured to be split into two parts. The control circuit part 19 accommodates a control circuit board (not shown) as a second circuit board inside a shallow container-shaped case. A computation part 110 (to be described later in FIG. 4) that controls the rotation of the motor 5 is mounted on the control circuit board (not shown). In this way, by separating the inverter circuit part 20 and the control circuit part 19 into separate circuit boards (the circuit board 27 and the circuit board (not shown) in the control circuit part 19)), the circuit boards can be efficiently disposed inside the housing, and the housing body of the electric tool can be suppressed from increasing in size.

A trigger switch 18 (to be described later in FIG. 3) for controlling on/off of the motor 5 is disposed in the central portion of the handle housing 45. The trigger switch 18 is a switch that is switched on or off by operation of the trigger lever 17. One side of the trigger switch 18 is connected to the wiring from the power cord 99. The LED 28 is provided between the trigger switch 18 and the control circuit part 19 as viewed in the direction of the rotation axis A1 and on an upper part of the handle housing 45.

Before the power transmission part 3 is attached, in the motor 5, a part of the stator 30 is inserted, from the front side of the motor housing 10 toward the back side in the direction of the rotation axis A1, into the motor housing 10 up to a predetermined position where it abuts against the motor housing 10. At this time, positioning of an insulator 40 (to be described later in FIG. 12) made of synthetic resin and located at a back end of the stator 30 is also performed. The bearing 15b that axially supports a back end portion of the rotation shaft 60 is a ball bearing, and an outer ring side thereof is held by a bearing holding part 16a of the bearing holder 16. The bearing holder 16 is manufactured by integral molding with the motor housing 10, and multiple ribs are formed in a lattice shape between an inner wall of the motor housing 10 and a cylindrical part holding the bearing 15b in order to support the bearing holding part 16a.

Figure 4:
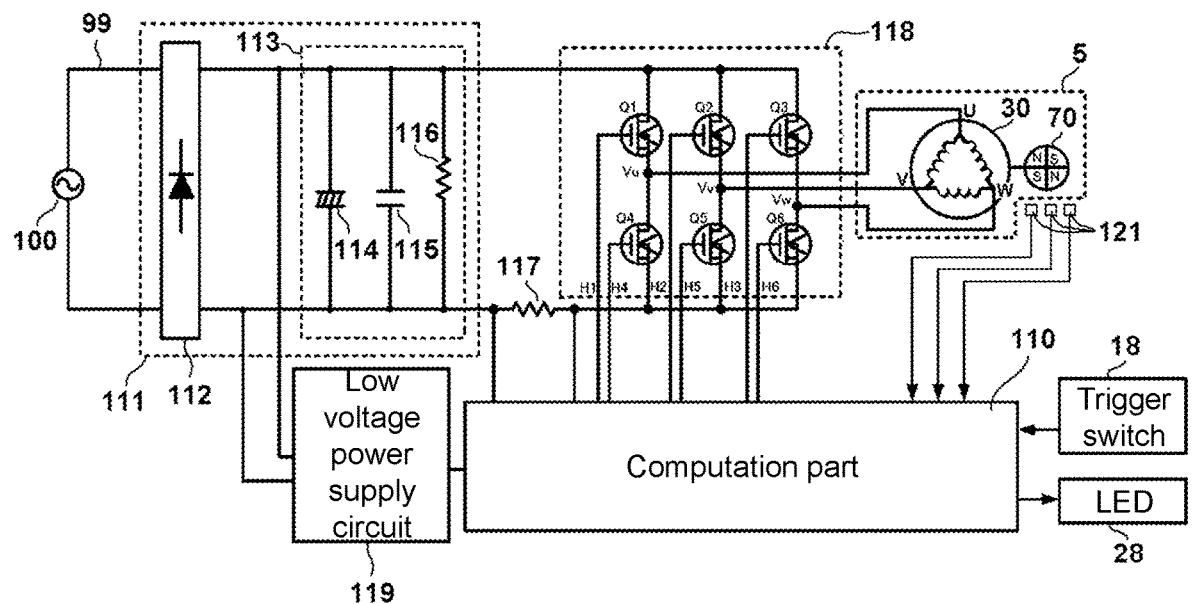
FIG. 4 is a circuit configuration diagram of a drive control system of a motor 5 of FIG. 1.

Next, a main circuit configuration of a drive control system of the motor 5 will be described with reference to FIG. 4. A commercial AC power supply 100 is supplied from the outside by the power cord 99 and rectified into direct current. A bridge diode 112 performs full-wave rectification on the alternating current input from the commercial AC power supply 100 and outputs it to a smoothing circuit 113. The smoothing circuit 113 smoothes pulsating current contained in the current rectified by the bridge diode 112 into a state close to direct current, and outputs the smoothed pulsating current to an inverter circuit 118. The smoothing circuit 113 is configured to include an electrolytic capacitor 114, a capacitor 115, and a discharge resistor 116. The inverter circuit 118 is configured to include six switching elements Q1 to Q6, and a switching operation is controlled by gate signals H1 to H6 supplied from the computation part 110. Although insulated gate bipolar transistors (IGBTs) are used for the switching elements Q1 to Q6, field effect transistors (FETs) may also be used. The output of the inverter circuit 118 is connected to a U-phase, a V-phase, and a-W phase of the coil of the motor 5. A low voltage power supply circuit 119 is connected to an output side of the bridge diode 112. The low voltage power supply circuit 119 is a known power supply circuit supplying direct current of a stable reference voltage (low voltage) for the computation part 110 to operate.

The rotor 70 having the permanent magnet rotate inside the stator 30 of the motor 5. A rotational position detecting element by means of the three Hall ICs 121 is provided in the vicinity of the rotor 70. The computation part 110 detects a rotational position of the rotor 70 by monitoring the output of the rotor 70. The sensor substrate 122 (see FIG. 3) mounted with the Hall ICs 121 is disposed in a position facing one end surface of the rotor 70.

The computation part 110 is a control part for performing control of on/off and rotation of the motor 5, and is mainly configured by using a microcomputer (hereinafter referred to as "microcomputer") (not shown). The computation part 110 is mounted on the circuit board of the control circuit part 19 (see FIG. 1), and, based on an activation signal input due to operation of the trigger switch 18, controls energization time and drive voltage for the coils U, V and W in order to rotate the motor 5. Although not shown herein, a speed change dial setting a rotational speed of the motor 5 may be provided, and the computation part 110 may adjust the speed of the motor 5 so as to match the speed set by the speed change dial.

The output of the computation part 110 is connected to respective gates of the six switching elements Q1 to Q6 of the inverter circuit 118. Respective emitters or collectors of the six switching elements Q1 to Q6 of the inverter circuit 118 are connected to the U-phase, V-phase, and W-phase of the coil that are delta-connected. The switching elements Q1 to Q6 perform the switching operation based on the gate signals H1 to H6 input from the computation part 110, and supply, as three-phase (U-phase, V-phase and W-phase) voltages Vu, Vv and Vw, DC voltages supplied from the commercial AC power supply 100 via a rectifier circuit 111, to each phase of the motor 5. The magnitude of a current supplied to the motor 5 is detected by the computation part 110 by detecting a voltage value across a shunt resistor 117 connected between the smoothing circuit 113 and the inverter circuit 118.

Figure 5:
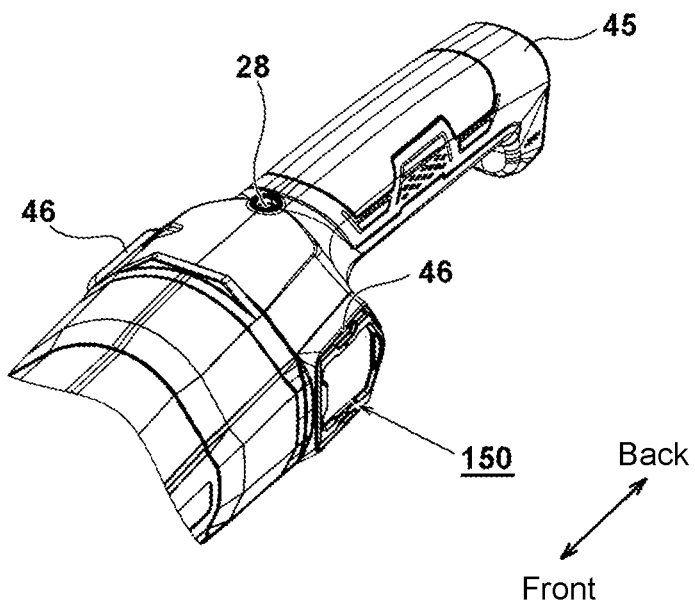
FIG. 5 is a partial perspective view of the vicinity of a handle housing 45 of the disc grinder 1 of FIG. 1 (in a state in which a filter member 150 is attached).

FIG. 5 is a partial perspective view of the vicinity of the handle housing 45 of the disc grinder 1 of FIG. 1, showing a state in which the filter member 150 is attached. The filter attachment part 46 is provided on the left side surface and the right side surface of the handle housing 45, a portion having substantially the same diameter as that of the motor housing 10. The filter member 150 for removing dust or the like contained in the passing air is attached to the filter attachment part 46. The filter member 150 can be manually attached to the filter attachment part 46 by the operator, and can also be manually removed from the filter attachment part 46 by the operator. Moreover, a filter member (not visible in the figure) attached to the right side of the handle housing 45 and the filter member 150 attached to the left side are common parts, and the filter member 150 can be attached to either the left or right side.

Figure 6:
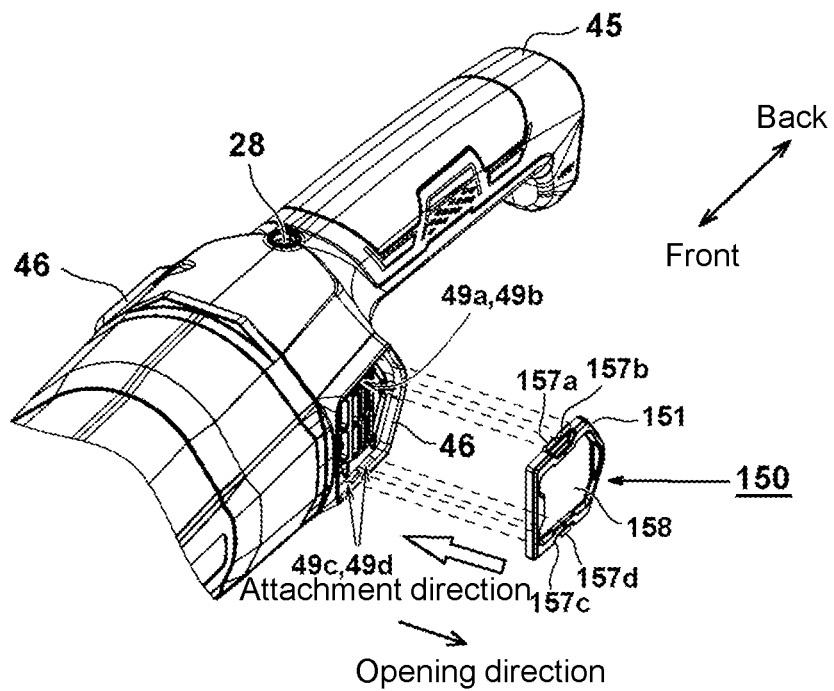
FIG. 6 is a partial perspective view of the vicinity of the handle housing 45 of the disc grinder 1 of FIG. 1 (in a state in which the filter member 150 is removed).

FIG. 6 is a partial perspective view of the vicinity of the handle housing 45 of the disc grinder 1 of FIG. 1, showing a state in which the filter member 150 is removed. The filter member 150 mounted on the left side of the handle housing 45 can be removed by being pinched by the operator with their fingers and being horizontally moved to the left. In addition, in the case of attachment, the filter member 150 can be attached by being horizontally moved to the right from the position shown in FIG. 6 and pushing a frame 151 into the inside of the filter attachment part 46 formed as an outer frame. The filter member 150 holds an outer edge position of the net 158 by the frame 151 composed of an elastic body having a predetermined thickness. The frame 151 has a substantially pentagonal shape as viewed from the left side surface, in which an upper side part and a lower side part are formed substantially parallel to each other, a front side is formed vertical, and a triangularly protruding portion is formed on a back side. Two claws 157a and 157b are formed on the upper side of the frame 151, and two claws 157c and 157d are formed on the lower side of the frame 151. When the filter member 150 is pushed into the inside of the filter attachment part 46, by plastic deformation of the claws 157a to 157d, the claws 157a to 157d are positioned in concave parts 49a to 49d (to be described later in FIG. 9) formed inside the filter attachment part 46. The claws 157a to 157d that have entered the concave parts 49a to 49d in the plastically deformed state return to their original shape and become convex, and change into a state of being fitted into the concave parts 49a to 49d. Thus, the filter member 150 is prevented from falling off the handle housing 45. In the present embodiment, the intake port for taking the outside air into the housing of the disc grinder 1 is provided only on the two filter attachment parts 46 provided on the left and right side surfaces of the handle housing 45.

Figure 7A:
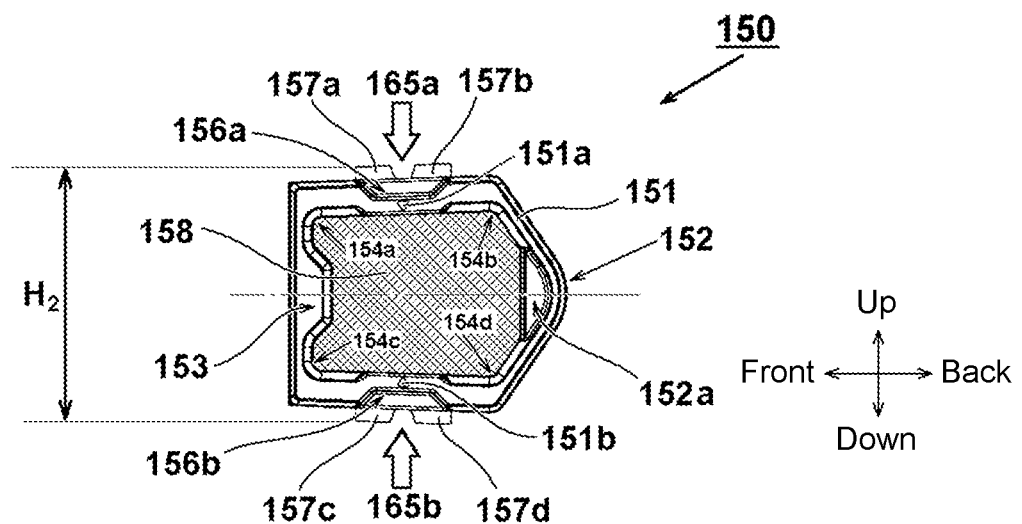
Figure 7B:
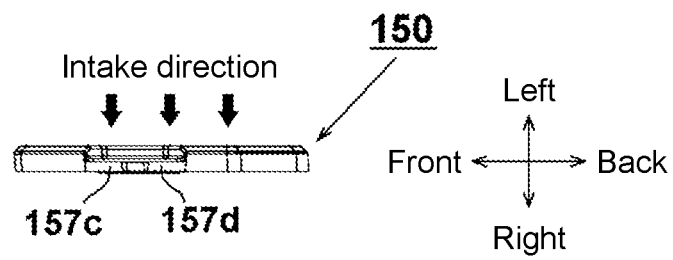
Figure 7C:
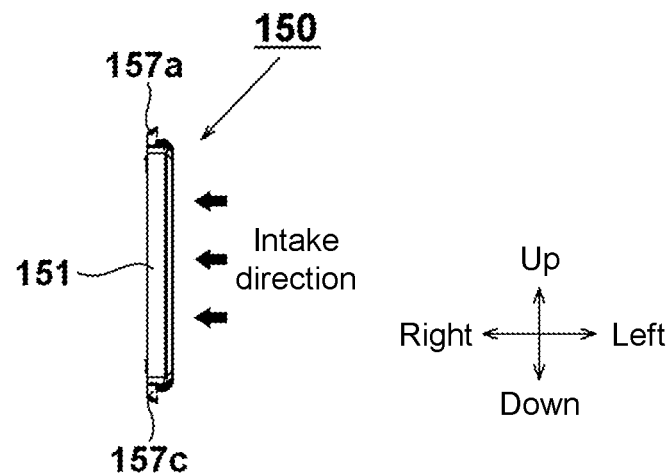
Figure 7D:
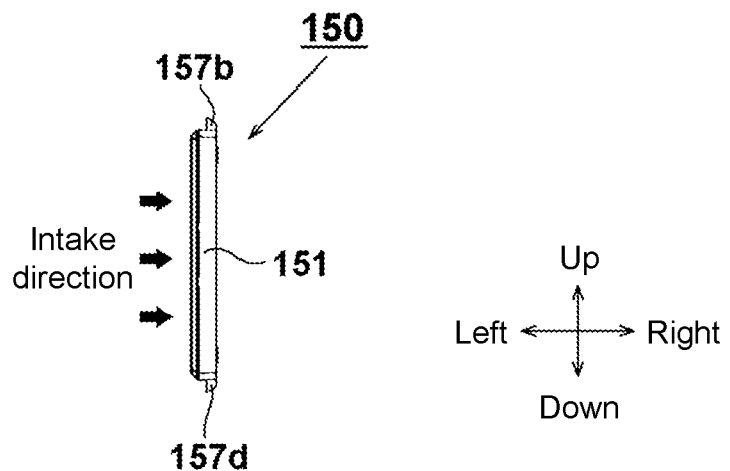

FIG. 7A to FIG. 7D illustrate the filter member 150 of FIG. 5, in which FIG. 7A is a side view, FIG. 7B is a top view, FIG. 7C is a front view, and FIG. 7D is a back view. The frame 151 is made of resin or rubber and is manufactured by injection molding, and the net 158 made of metal (stainless steel in the present embodiment) is provided inside. An outer edge of the net 158 is cast into the frame 151. The net 158 is a netlike member provided to prevent dust or the like from entering from an inlet of a suction port, and is capable of preventing small metal powder from being sucked into the housing by having fine meshes. The net of the filter member 150 may not be made of metal, and a filter made of nonwoven fabric or paper may be used as the net. However, if the net is made of metal, the meshes can be made sufficiently small, the net is easily fixed by casting with an elastic member such as rubber, and high durability is also achieved. Both the frame 151 and the net 158 are flexible. When the frame 151 is bent and deformed, in accordance with this motion, the net 158 can also be deformed. Since the frame 151 made of rubber is easily elastically deformed, the claws 157a to 157d for holding the filter member 150 on the filter attachment part 46 by using elastic force of the frame 151 are integrally formed on the upper side part and the lower side part of the frame 151. Since the claws 157a to 157d are in the shape of a thin plate and can easily be elastically deformed in the left-right direction, they are capable of holding the filter member 150 on the filter attachment part 46 by latching onto the concave parts 49a to 49d formed in the filter attachment part 46. In addition, while the convex claws 157a to 157d and the concave parts 49a to 49d are merely in latching relationship, by the upper and lower sides of the frame 151 being pressed against a form 46a (see FIG. 11) of the filter attachment part 46 by a restoring force of the frame 151 in the up-down direction, the filter member 150 is stably held without coming off due to vibration or the like during operation. Furthermore, since a suction force by the cooling air works during rotation of the motor 5, the filter member 150 can be more stably held on the filter attachment part 46.

In the vicinity of the center in the front-back direction of the upper and lower sides of the filter member 150, a lower portion recessed in the up-down direction and formed into a narrow width in the up-down direction is provided. Due to a difference in height between the lower portion and an upper surface of the frame 151, step-shaped grips (stepped parts) 156a and 156b are formed. A reason for forming the grips 156a and 156b is for the operator to easily grip the frame 151 by pinching it with fingers as shown by arrows 165a and 165b when removing the filter member 150. In addition, by separating the claws 157a and 157b after forming the grips 156a and 156b, specific portions of the frame 151, that is, thin-frame portions 151a and 151b in which the grips 156a and 156b are formed, are likely to bend in the directions of the arrows 165a and 165b. For example, when the frame 151 is deformed in the directions of the arrows 165a and 165b, since a height H2 of the claws 157a and 157b and the claws 157c and 157d can be made smaller than a height $H_1$ (see FIG. 9 to be described later) of the filter attachment part 46, the filter member 150 can be easily attached to and removed from the filter attachment part 46. On the other hand, when the upper and lower sides of the frame 151 are likely to bend, there is a risk the filter member 150 may become likely to come off during attachment. Therefore, a thick frame 153 in which a large width (front-back length) is secured is formed in the vicinity of the vertical center of the front side of the frame 151. The restoring force of the front side portion of the frame 151 is increased, and energization is performed so that the upper side returns in a direction opposite the arrow 165a and the lower side returns in a direction opposite the arrow 165b. Since an energization range of these energization forces is limited by the net 158, the net 158 is maintained in an ideally stretched state.

The back side of the filter member 150 is of a shape in which a corner 152 protruding in a triangular shape toward the back side is provided in the vicinity of the vertical center. A reason for this shape is to make the shape along the narrowed shape of the handle housing 45 as shown in FIG. 1 and FIG. 6. Inner corner sides of the corner 152 protruding toward the back side are connected by a rib 152a of a substantially triangular shape having a reduced thickness. Strength of a specific portion of the frame 151 is adjusted so that the bent frame 151 can easily return in a specific direction, that is, energization is performed so that the upper side returns in the direction opposite the arrow 165a and the lower side returns in the direction opposite the arrow 165b. Inner corner portions 154a to 154d of the frame 151 are formed by gentle curved surfaces so as to have a slight radius of curvature, and are configured so that metal powder or the like is less likely to stay at the corner.

FIG. 7C is a front view, and FIG. 7D is a back view. As is clear from these figures, the claws 157a to 157d are disposed near the inside of the housing. In other words, among the claws 157a to 157d, in positions biased to a side closer to the handle housing 45, the claws 157a and 157b are provided so as to extend upward from the frame 151 of the filter member 150, and the claws 157c and 157d are provided so as to extend downward from the frame 151 of the filter member 150.

Figure 8A:
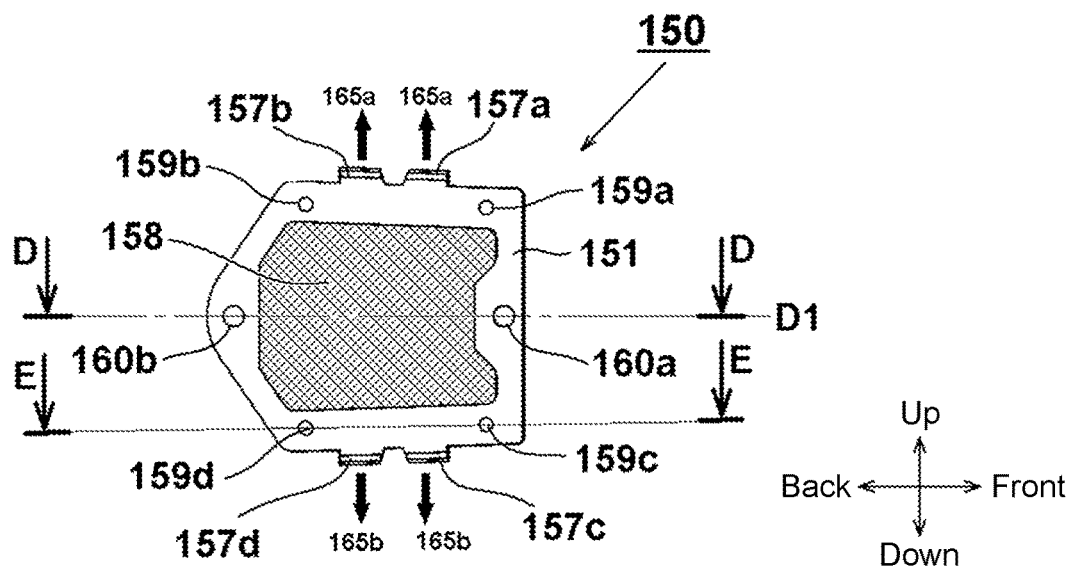
FIG. 8A is a side view as viewed from a side opposite that of FIG. 7A.

FIG. 8A is a side view of the filter member 150 as viewed from the back side, that is, the opposite side of FIG. 7A. Four holes 159a to 159d are formed in the four corners of the frame 151 to hold the net 158 in a predetermined casting height position when the net 158 is cast. This is a molding mark formed when the net 158 is maintained in a state of being floated by a predetermined distance from a bottom surface of a mold when the filter member 150 is molded with a surface direction being horizontal. On the other hand, holes 160a and 160b are formed to be utilized as an auxiliary holding means for holding the filter member 150 in the handle housing 45.

Figure 8B:
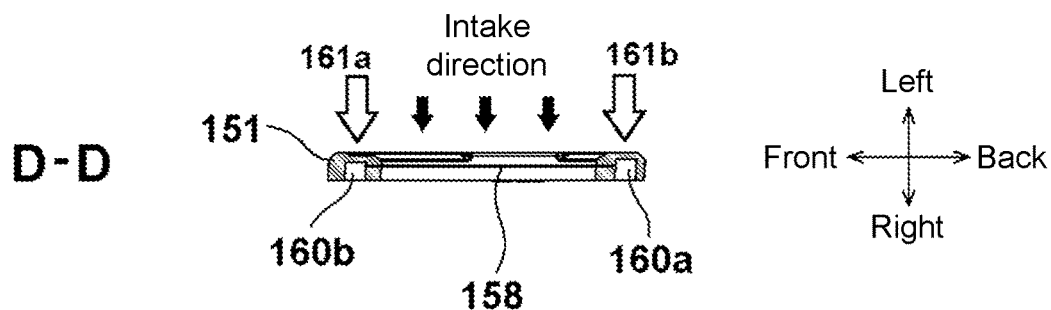
FIG. 8B is a sectional view of a D-D section.

FIG. 8B is a sectional view of a D-D section of FIG. 8A. The holes 160a and 160b have a slightly larger diameter than the other holes 159a to 159d, and are columnar non-through holes having a length that may increase with respect to an attachment direction (normal direction of an outer surface of the handle housing 45). Hence, after the filter member 150 is attached to the handle housing 45 from the state shown in FIG. 6 and the upper and lower claws 157a to 157d are latched onto the concave parts 49a to 49d (see FIG. 9 to be described later) of the filter attachment part 46 (see FIG. 6), by pushing an opposite side of the hole 160a with a finger as shown by an arrow 161a, the hole 160a may be engaged with a convex columnar protrusion 48a (see FIG. 9 to be described later) formed on the handle housing 45 side. Similarly, by the operator pushing an opposite side of the hole 160b with a finger as shown by an arrow 161b, the hole 160b may be engaged with a columnar protrusion 48b (see FIG. 9 to be described later) formed on the handle housing 45 side. Since the holes 160a and 160b are formed in the frame 151 having elastic force, the columnar protrusions 48a and 48b (see FIG. 9) are fitted therein by plastic deformation, and the fitted state is maintained by frictional force. Moreover, since the frictional force generated by the holes 160a and 160b is not excessively strong, when the filter member 150 is removed, the fitting state of the holes 160a and 160b and the columnar protrusions 48a and 48b can be easily eliminated.

Figure 8C:
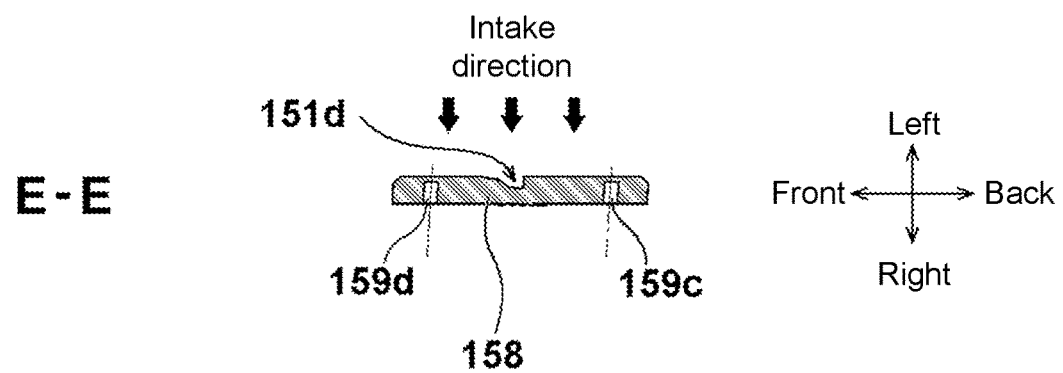
FIG. 8C is a sectional view of an E-E section.

FIG. 8C is a sectional view of an E-E section of FIG. 8A. From this figure, a central direction in the longitudinal direction of the holes 159c and 159d is slightly inclined with respect to the normal direction (coincident with an intake direction) with respect to a surface of the filter member 150. However, this is only because of the relationship with a mold for injection molding. In addition, a recess 151d is formed by depressing a part of the frame 151 in a wedge shape. By forming the wedge-shaped recess 151d, partial strength of the frame 151 can be reduced, and the claws 157c and 157d can be easily bent in the direction of the arrow 165b. Hence, by the operator gripping the frame 151 of the filter member 150 by hand, the filter member 150 slightly bends inward, and the engagement state between the claws 157a to 157d and the filter attachment part 46 can be easily eliminated. Even if the frame 151 is bent inward, since the net 158 made of stainless steel or the like is also elastically deformable, when the bent state is eliminated, restoring force of the net 158 also applies, and the filter member 150 easily restores its original shape. There is a risk that the elastic deformation state may deteriorate if the filter member 150 is used for many years. However, since the filter member 150 can be manufactured at low cost, it can be easily replaced by the operator if sold separately as a repair part of the disc grinder 1.

Figure 9:
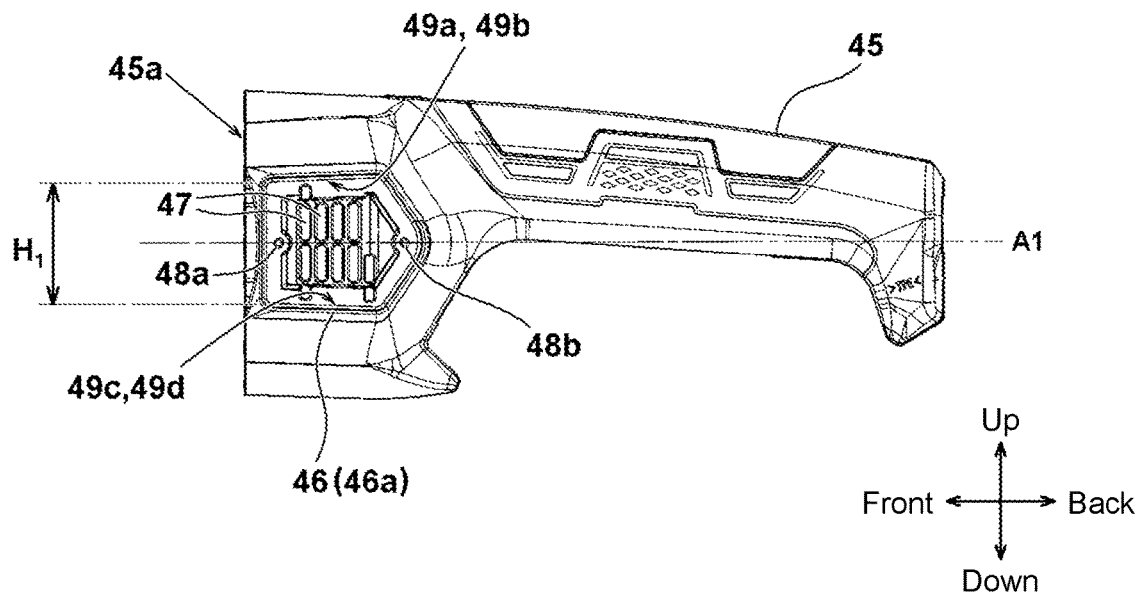
FIG. 9 is a left side view of the handle housing 45 of FIG. 1.

FIG. 9 is a left side view of the handle housing 45 of FIG. 1. The front side in the axial direction of the handle housing 45 is a cylindrical large-diameter part having substantially the same diameter as that of the motor housing 10, and the filter attachment part 46 is formed on a left side surface of the large-diameter part. The filter attachment part 46 protrudes in a convex shape to the left from an outer peripheral cylindrical surface of the motor housing 10, and an outer peripheral edge is formed by the convex form 46a having a substantially pentagonal contour. An inner area of the form 46a is not a cylindrical surface but is formed in a substantially planar shape, and multiple slit-like intake ports 47 are formed therein. Herein, a total of 10 slit-like through holes are formed and function as air intakes. Since the intake ports 47 serve as slits having a sufficiently small opening by themselves, they are capable of suppressing the entry of large dust into the housing. However, in the present embodiment, the filter member 150 is provided so as to completely cover the outside of the intake port 47, and the air that has passed through the meshes of the net 158 of the filter member 150 may be sucked. Thus, even small dust can be collected. Although not visible in the figure, the two concave parts 49a and 49b that are recessed upward are formed on an inner side surface (lower surface substantially parallel to the radial direction) of an upper side part of the form 46a. Similarly, the two concave parts 49c and 49d that are recessed downward are formed on an inner side surface (upper surface substantially parallel to the radial direction) of a lower side part of the form 46a. Since the recess space formed by the concave parts 49a to 49d have inner wall surfaces not only on the front and back sides but also in the left-right direction, in the fitting state with the claws 157a to 157d, movement of the claws 157a to 157d in the left-right direction is particularly suppressed. A distance (height H1) between the upper side part and the lower side part of the form 46a is made slightly larger than the height of a portion of the frame 151 of the filter member 150 excluding the claws 157a to 157d.

The columnar protrusion 48a extending in the normal direction with respect to the central axis A1 of the handle housing 45 is formed in the inner area in the vicinity of the center of the front side part of the form 46a that vertically extends. Similarly, the columnar protrusion 48b extending in the normal direction with respect to the central axis A1 of the handle housing 45 is formed in an inner area of a portion formed in a corner shape, which is behind the form 46a. The columnar protrusions 48a and 48b are fitted into the holes 160a and 160b described in FIG. 8. Outer peripheral surfaces of the columnar protrusions 48a and 48b and inner peripheral cylindrical surfaces of the holes 160a and 160b are held by frictional force and assist in holding the filter member 150 so as to prevent its movement in a removal direction. In addition, since it is possible to strongly prevent movement in a direction intersecting the removal direction, it is possible to effectively resist vibration in the front-back and up-down directions applied to the filter member 150. Since the four claws 157a to 157d are capable of effectively resisting the vibration of the filter member 150 in the left-right direction, as a result, the filter member 150 can be held in the housing in all directions (front-back, left-right and up-down directions).

Figure 10:
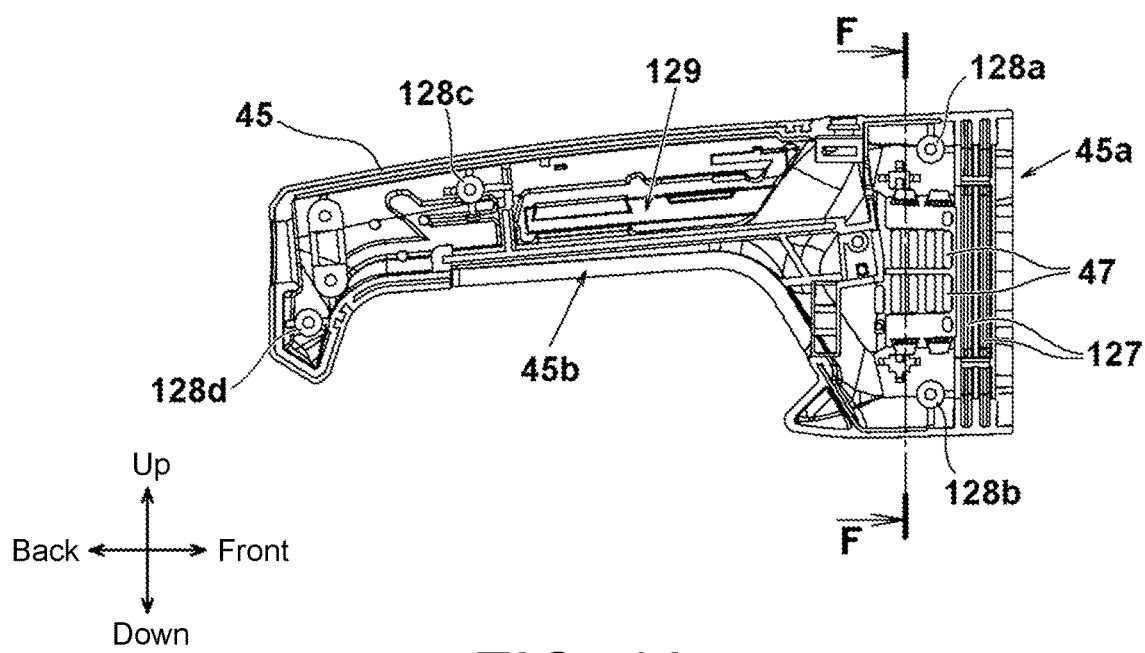
FIG. 10 is a side view of the handle housing 45 of FIG. 9 as viewed from the inside.

FIG. 10 is a side view of the handle housing 45 of FIG. 1 as viewed from the inside. The handle housing 45 is of the left-right split type, and FIG. 10 shows the members on the left side Four screw bosses 128a to 128d are formed on the handle housing 45, and are screwed to the members on the right side of the hand housing 45 by screws (not shown). In a portion of the handle housing 45 gripped by the operator, an accommodation space 129 accommodating the trigger switch 18 (see FIG. 3) is formed, and an opening 45b for protruding the trigger lever 17 (see FIG. 3) is formed on the lower side of the accommodation space 129. In order to connect with the handle part 4, in the vicinity of the opening 45a on the front side of the handle housing 45, the concave circular circumferential groove part 127 continuous in the circumferential direction is formed, and the slit-like intake ports 47 are formed immediately therebehind. As can be understood by comparing FIG. 10 with FIG. 3, as viewed in the axial direction, the control circuit part 19 and the intake ports 47 are located in positions overlapping each other as viewed in the direction of the rotation axis A1. Accordingly, the outside air sucked via the intake ports 47, after cooling control circuit elements such as the microcomputer or the like mounted in the control circuit part 19 in the first place, passes through the opening 45a and flows to the front side in the direction of the rotation axis A1, and flows into the motor housing 10.

Figure 11:
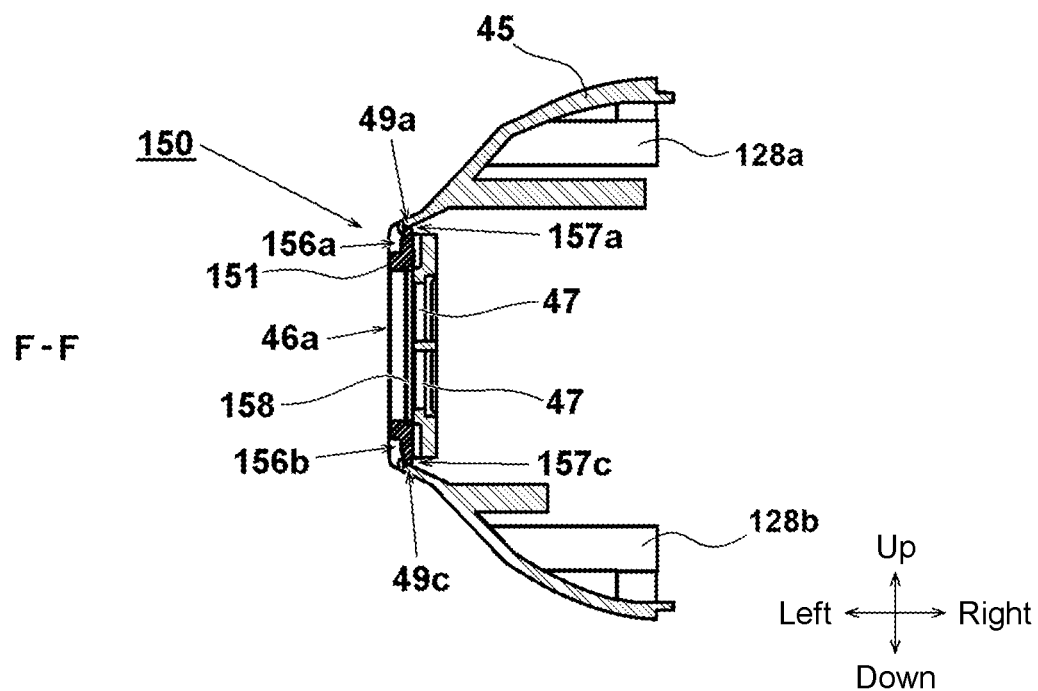
FIG. 11 is a sectional view of an F-F section of FIG. 10.

FIG. 11 is a sectional view of an F-F section of FIG. 10. However, a state is shown in which the filter member 150 is attached in the state of FIG. 10. The frame 151 is formed on an outer peripheral surface of the filter member 150, and the net 158 made of metal is held so as to be cast into the frame 151. As can be understood from this figure, the filter member 150 has a positional relationship so that it is located inside an outer edge position (leftmost position) of the form 46a of the filter attachment part 46. Accordingly, since the net 158 also does not protrude outside of the form 46a, even if dust is captured by the net 158, there is little risk that the dust will greatly accumulate from the form 46a to the outside. In addition, since the grips 156a and 156b are formed in the vicinity of the front-back center of the frame 151 and a predetermined concave part is secured between the frame 151 and the form 46a, the operator is able to bend the frame 151 by putting their finger in the concave part and gripping the vicinity of the grips 156a and 156b with the thumb and the forefinger, and the engagement state between the claws 157a to 157d and the concave parts 49a to 49d can be eliminated. While FIG. 11 shows a sectional view of only the left side portion of the handle housing 45 shown in FIG. 10, the sectional shape of the filter attachment part 46 of the right side portion is left-right symmetrical and identical to that of FIG. 11.

Figure 12:
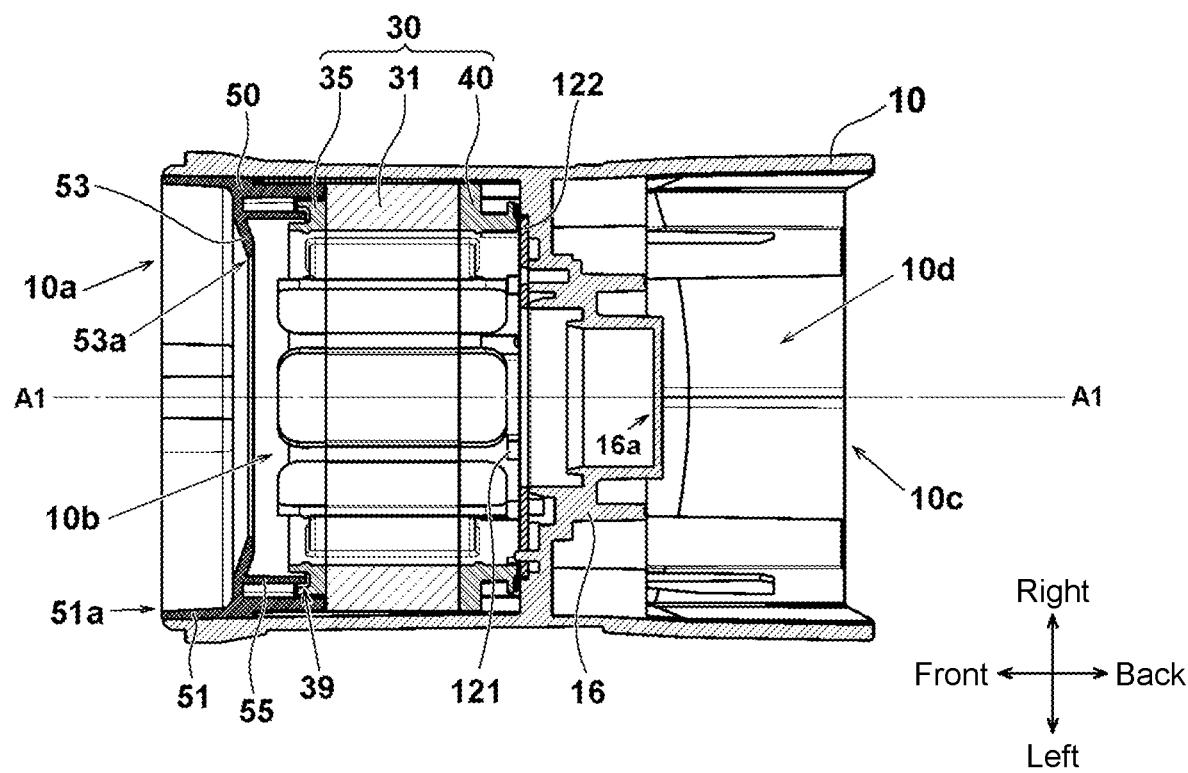
FIG. 12 is an enlarged sectional view of the vicinity of the motor 5 of the disc grinder 1 of FIG. 1.

FIG. 12 is an enlarged sectional view of the vicinity of the motor 5 of FIG. 1. The stator 30 is composed of a stator core 31, insulators 35 and 40, and a coil (not shown) wound around a teeth part of the stator core 31. The stator 30 is assembled by being inserted into the back side from an opening part 10a on the front side of the integrally molded cylindrical motor housing 10. In FIG. 12, although the rotor 70 and the rotation shaft 60 are not shown in order to describe a built-in structure of the stator 30, the rotor 70 and the rotation shaft 60 are similarly inserted from the opening part 10a on the front side of the motor housing 10. In the motor housing 10, the bearing holder 16 is formed in the substantial center in the front-back direction, and the motor housing 10 is split in the front-back direction into an accommodation chamber 10b in which the motor 5 is accommodated and an accommodation chamber 10d in which the control circuit part 19 is accommodated. Since the cylindrical motor housing 10 and the portion of the bearing holder 16 that radially connects the inside in the vicinity of the center of the motor housing 10 are manufactured by integral molding of synthetic resin, it is possible to highly increase the strength of the motor housing 10. The bearing holder 16 is a portion for holding the bearing 15b (see FIG. 3) on the back side of the motor 5, in which the cylindrical bearing holding part 16a whose back side is closed is formed. On an outer peripheral side of the bearing holding part 16a of the bearing holder 16, a lattice shape is formed so that multiple air holes are formed in a direction parallel to the rotation axis A1, making it possible for the cooling air to pass from the accommodation chamber 10d on the back side to the accommodation chamber 10b on the front side.

The sensor substrate 122 is provided between the insulator 40 on the back side of the stator core 31 and a front portion of the bearing holder 16. The sensor substrate 122 is an annular substrate for mounting the three Hall ICs 121. Herein, the sensor substrate 122 is not screwed to the insulator 40 side, but is screwed to the bearing holder 16 side. Since the stator core 31 is assembled inside the motor housing 10 after being wound with the coil, at that time, an assembled state is achieved in which the insulators 35 and 40 have been combined with the stator core 31. Accordingly, after the stator 30 in the assembled state is accommodated in the motor housing 10, the fan guide 50 will be built in from the front side (actually, since there are built-ins such as the rotor 70 that has been built in the rotation shaft 60, various assembly procedures are possible).

The fan guide 50 serves to keep the stator 30 from moving in the axial direction, and fulfills a rectification function of guiding the cooling air flowing from the back side to the front side of the stator 30 radially inward and flowing it into the cooling fan 13. The present embodiment is particularly characterized in that the fan guide 50 forms a labyrinth space 39 between the fan guide 50 and the insulator 40. The labyrinth space 39 refers to the following configuration. A space (passage) from the outer periphery to an inner periphery of the stator core 31 through a front end of the insulator 35 is made as narrow as possible, the passage is formed in a zigzag shape (continuous turns) and its resistance prevents the inflow of air from the outer peripheral side to the inner peripheral side. Specifically, a concave part recessed in the axial direction and continuous in the circumferential direction is formed in a front end surface of the insulator 35, a convex part protruding in the axial direction and continuous in the circumferential direction is formed in the fan guide 50 corresponding thereto. While the convex part enters the concave part, they are kept in a non-contact state so that the flow of the air is extremely suppressed. By forming the labyrinth space 39, it is possible to almost eliminate the flow of air that flows through the outer periphery of the stator core 31 from the back to the front in the axial direction and flows into the insulator 35 from radially outside to radially inside. As a result, since the flow of the cooling air that cools the motor 5 can be substantially limited to the air flowing on the inner peripheral side of the stator core 31, flow velocity on the inner peripheral side of the stator core 31 can be increased. In particular, since a large amount of air is able to flow around the coil that generates heat during operation, it is possible to improve cooling efficiency of the motor 5.

Figure 13:
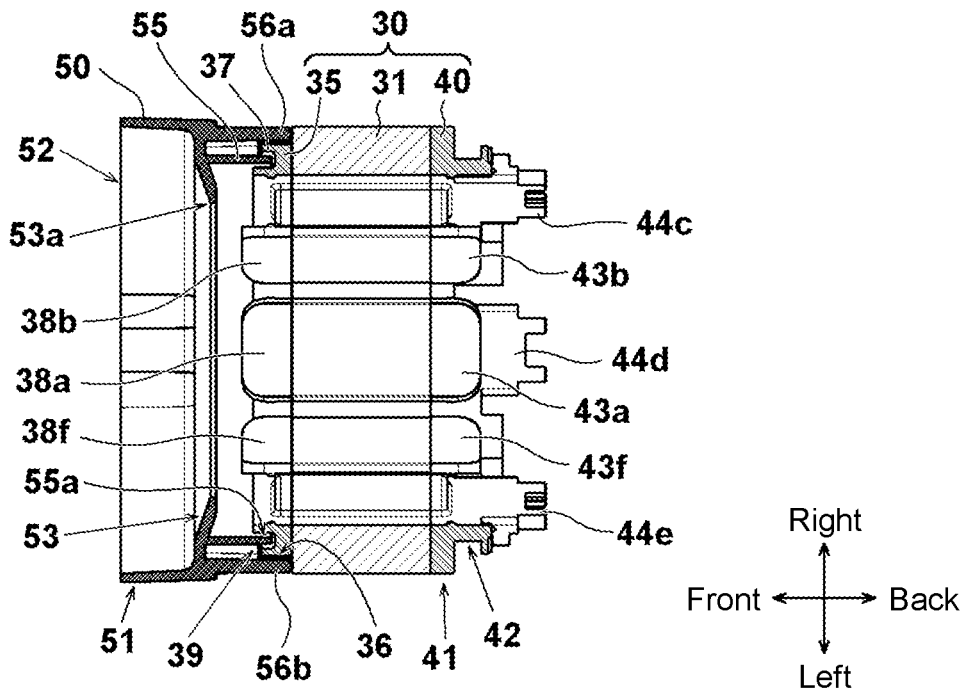
FIG. 13 is an enlarged sectional view of the motor 5 and a fan guide 50 of FIG. 12.

FIG. 13 is an enlarged sectional view of the motor 5 and the fan guide 50 of FIG. 12. A stator coil (not shown) is formed by winding a copper enamel wire multiple times so as to extend over winding parts 38a to 38f (38c to 38e are not visible in the figure) of the insulator 35 at the front and winding parts 43a to 43f (43c to 43e are not visible in the figure) of the insulator 40 at the back. Six coils (not shown) formed by winding are wired so as to form delta connection.

Six drawers 44a to 44f (44a, 44b and 44f are not visible in the figure) protruding in the axial direction are formed on the back side of an annular part 41 of the insulator 40. The drawers 44a to 44f serve to guide the winding of the coils that are delta-connected, and are connection points where lead wires for supplying drive power are held and connected since they are intermediate points of the delta connection. A circumferential groove 42 is formed on an outer peripheral surface of the insulator 40, and by wiring a crossover wire (not shown) between the coils inside the circumferential groove 42, the crossover wire is wired so as not to protrude radially outward from outer edges of the stator core 31 and the insulator 40.

In the insulator 35 on the front side, a cylindrical part 36 is provided on an outer peripheral side; on a front end surface formed at a right angle to the rotation axis A1, an annular groove 37 is formed in a concave shape so as to be recessed from the front side to the back side in the axial direction. In the fan guide 50, a first cylindrical part 51 having a large diameter is formed on the front side, and a guide surface 53 is formed extending so as to be narrowed radially inward from the vicinity of a back end of the first cylindrical part 51. The inside of an inner peripheral end of the guide surface 53 is an opening 53a, which is a space through which the rotation shaft 60 of the motor 5 penetrates and through which air passes. In two places in the first cylindrical part 51 in the circumferential direction, that is, on a right side surface and a left side surface, abutment ribs 56a and 56b are formed extending backward in the direction of the rotation axis A1. The abutment ribs 56a and 56b, by abutting against the stator core 31, sandwich and fix the stator core 31 in a gap between themselves and the bearing holder 16 (see FIG. 12) of the motor housing 10. As viewed from a sectional position (horizontal section) of FIG. 13, the abutment ribs 56a and 56b are present on an outer periphery of the fan guide 50. However, as will be apparent from FIG. 15 and FIG. 16 to be described later, when the horizontal sectional position of the fan guide 50 is shifted, the abutment ribs 56a and 56b are not provided on the outer periphery.

In the fan guide 50 of the present embodiment, a new member not provided in a conventional fan guide, that is, a second cylindrical part 55, is formed. The second cylindrical part 55 is connected to a back surface side of the guide surface 53, and is formed in a cylindrical shape having a constant diameter that does not change according to an axial position. The second cylindrical part 55, together with other components such as the first cylindrical part 51, are manufactured by integral molding of synthetic resin. A back end 55a of the second cylindrical part 55 extends to a position reaching the back side of an opening surface of the annular groove 37, but the back end 55a does not contact the insulator 35. Of course, the second cylindrical part 55 and the insulator 35 do not have to be in complete non-contact with each other in all portions, and are in substantial non-contact to the extent sufficient to obtain at least the labyrinth effect. A reason for completely preventing a contact state is that, if the second cylindrical part 55 and the insulator 35 strongly abut against each other, there is a risk of a decrease in air volume due to contact of the guide surface 53 with the cooling fan 13 due to bending of the guide surface 53 or a change in air passage resistance. By formation in this way, the air flowing in the axial direction through a space between the outer peripheral side of the stator core 31 and the motor housing 10 can be suppressed from passing through the labyrinth space formed by the back end 55a of the second cylindrical part 55 and the annular groove 37 and flowing toward the cooling fan 13 (see FIG. 1).

Figure 14:
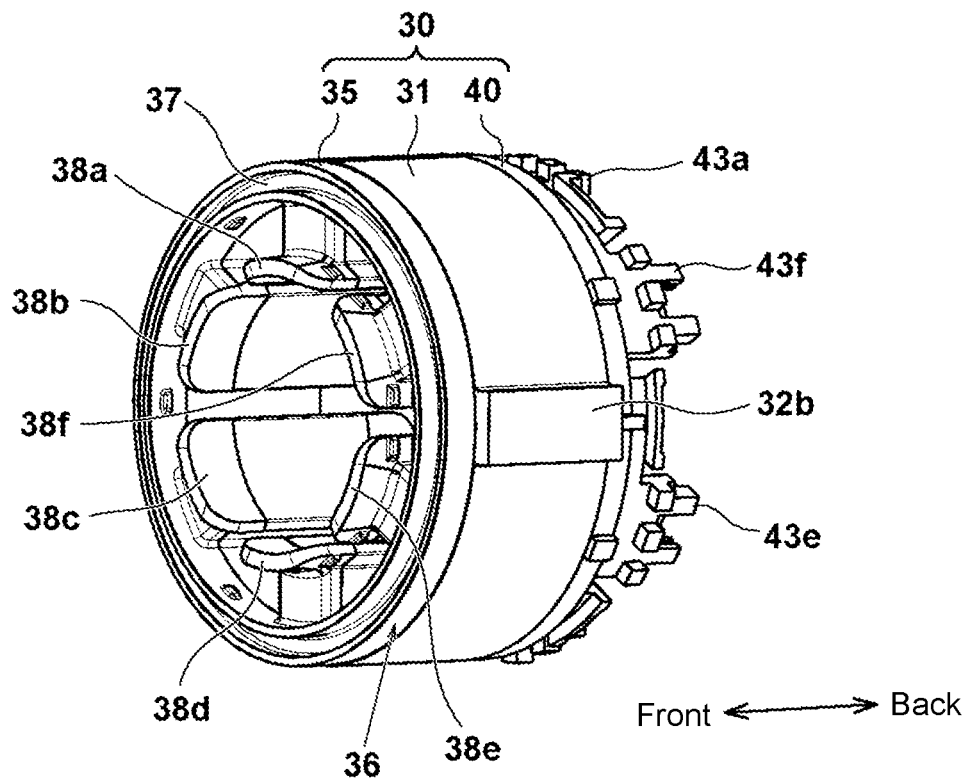
FIG. 14 is a perspective view of a stator 30 of FIG. 12 as viewed from the front side.

FIG. 14 is a perspective view of the stator 30 of FIG. 12 as viewed from the front side. The insulator 35 is a guide member for winding the coil around the teeth part of the stator core 31, and is manufactured by integral molding of a non-conductive material (for example, synthetic resin) that does not conduct electricity. In the insulator 35, the multiple winding parts 38a to 38f are formed extending inward from the cylindrical part 36. The winding parts 38a to 38f are holding members on the front side of the coil (not shown), and their shape in perspective view from the front side of the rotation axis A1 is the same as the shape of the teeth part formed on the stator core 31. The annular groove 37 continuously formed in the circumferential direction is formed on a front side surface of the cylindrical part 36. As is apparent from FIG. 14, the annular groove 37 is a groove recessed backward from a front surface in the direction of the rotation axis A1. The stator core 31 is composed of a laminated iron core in which multiple steel plates are laminated. In two opposing places on the outer periphery, keys 32a and 32b (not visible in the figure) are formed, which are convex parts protruding in the axial direction and are continuous in the axial direction. As is clear from the figure, the key 32b has a shape protruding radially outward from an outer peripheral surface of the insulator 35. A protruding front end surface of the key 32b is a surface that abuts against the abutment rib 56b of the fan guide 50.

Figure 15:
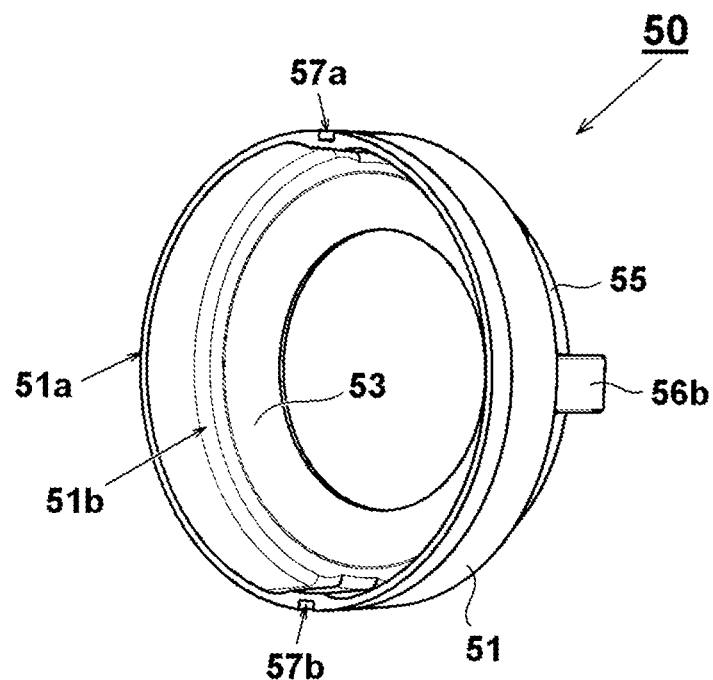
FIG. 15 is a perspective view of the fan guide 50 alone of FIG. 12 as viewed from the front side.

FIG. 15 is a perspective view of the fan guide 50 alone of FIG. 12 as viewed from the front side. The fan guide 50 is configured to include: the first cylindrical part 51 covering an outer periphery of a space in which the cooling fan 13 rotates; and the guide surface 53 forming a wall surface that is narrowed toward the inner opening 53a on the back side of the first cylindrical part 51. In two places respectively on the upper side and lower side of the first cylindrical part 51, concave parts 57a and 57b for stopping rotation are formed so as to prevent the fan guide 50 from rotating by fitting with protrusions on the inner peripheral side of the motor housing 10. A connecting portion 51b between the first cylindrical part 51 and the guide surface 53 is not of a shape of a right-angled step, and enhances the strength and smoothes the flow of cooling air as a curved surface that draws a smooth curved surface. The opening 51a of the first cylindrical part 51 of the fan guide 50 is in a satisfactory abutment against the bearing holding plate 12 (see FIG. 1) that presses the back side of the bearing 15a (see FIG. 1), thereby forming a rotation space for the cooling fan 13 between the opening 51a and the bearing holding plate 12.

Figure 16:
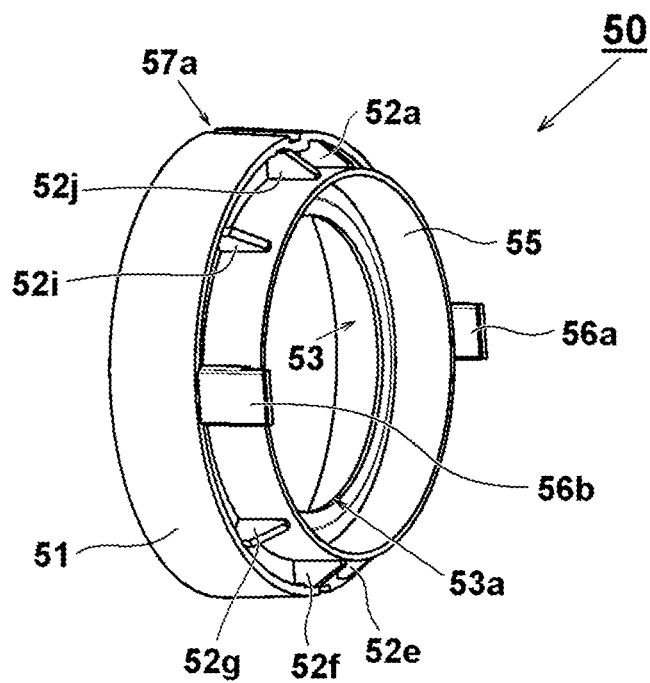
FIG. 16 is a perspective view of the fan guide 50 alone of FIG. 12 as viewed from the back side.

FIG. 16 is a perspective view of the fan guide 50 alone of FIG. 12 as viewed from the back side. The first cylindrical part 51 and the second cylindrical part 55, which are formed coaxially and have different diameters, are manufactured by integral molding of synthetic resin. In order to increase the strength, between the first cylindrical part 51 and the second cylindrical part 55, multiple reinforcing ribs 52a to 52j (however, 52b to 52d and 52h are not visible in the figure) are formed extending in the direction parallel to the rotation axis A1. The guide surface 53 is a narrowing member having the opening 53a sufficiently smaller than the diameter of the second cylindrical part 55, and the air reaches the rotation space for the cooling fan 13 from the back side via the opening 53a.

Figure 17:
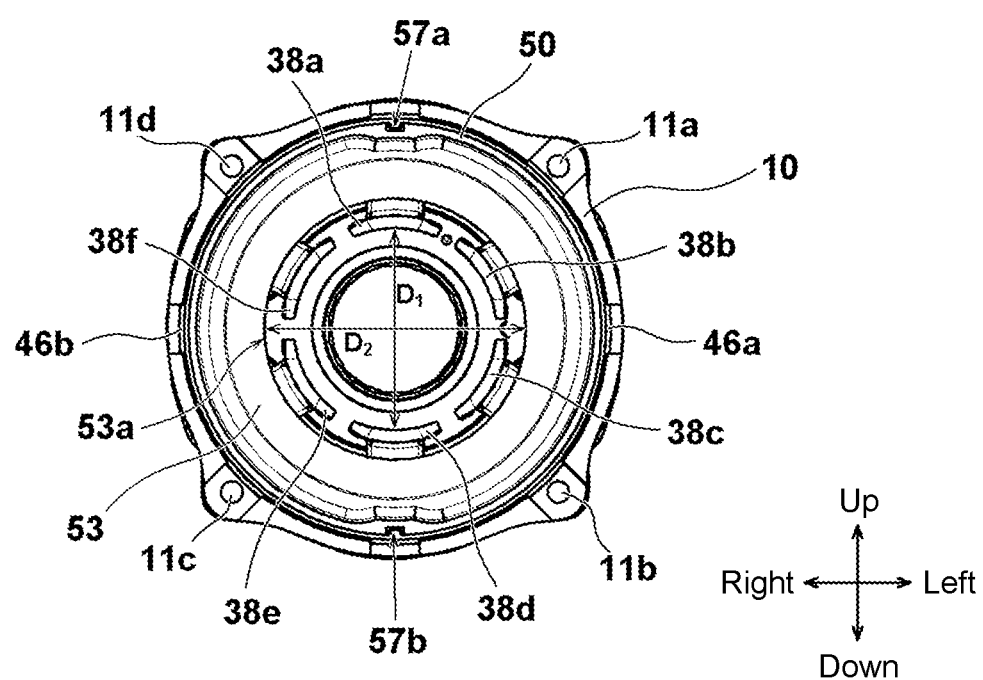
FIG. 17 is a front view of a motor housing 10 from which a gear case 6 and a rotor 70 are removed.

FIG. 17 is a front view of the motor housing 10 from which the gear case 6 and the rotor 70 are removed. The size of the opening 53a of the guide surface 53 is set to a diameter D2 sufficiently larger than the teeth part (equal to the innermost diameter $D_1$ of the insulator) of the stator core 31. Accordingly, the cooling air flowing in the axial direction on the inner peripheral side of the stator core 31 efficiently flows from the opening 53a to the space on the cooling fan 13 side almost without change. In addition, since an airflow from the outer peripheral side of the stator core 31 to the opening 53a through a front surface of the insulator 35 is hindered by the labyrinth space 39 formed by the second cylindrical part 55 (see FIG. 13) and the annular groove 37 (see FIG. 13), the flow of the cooling air flowing through the stator core 31 side will not be disturbed.

As described above, according to the present embodiment, since the shape of the fan guide 50 and a part of the shape of the insulator 35 adjacent thereto are changed to form the labyrinth space 39 (see FIG. 12), the cooling air is able to concentratedly flow into the inner space of the stator 30, and sufficient cooling performance of the coil as a heating source can be ensured.

Figure 18A:
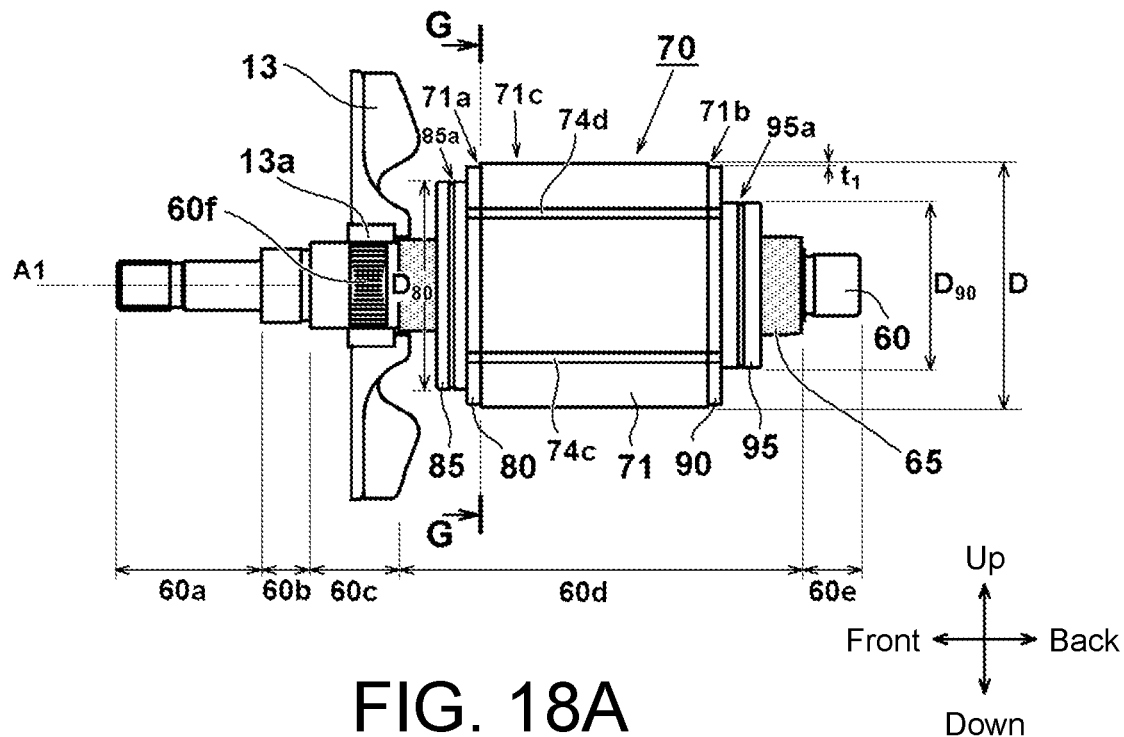
FIG. 18A is a side view of the rotor 70 and a cooling fan 13 of the motor 5.
Figure 18B:
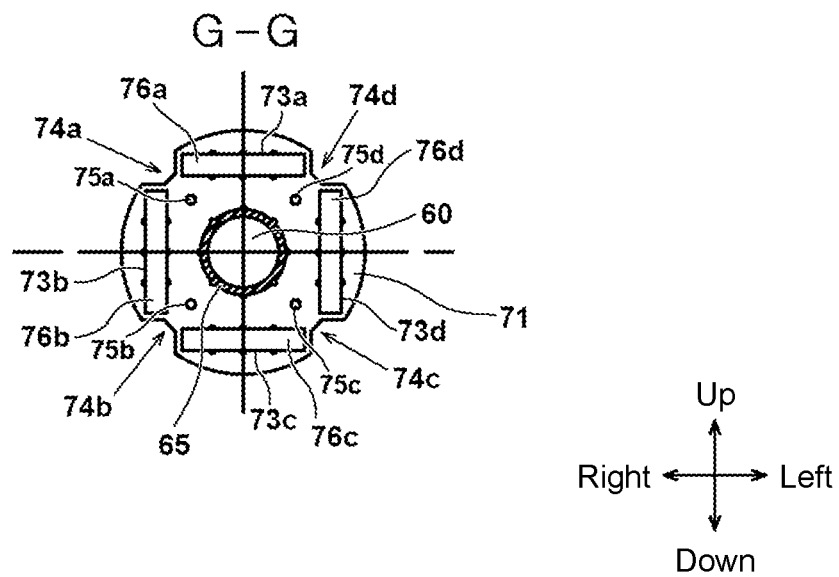
FIG. 18B is a sectional view (side view of a rotor core 71) of a G-G section of FIG. 18A.

Next, a structure on the rotor 70 side is described with reference to FIG. 18A to FIG. 18B and FIG. 19A to FIG. 19C. FIG. 18A is a side view of the rotor 70 and the cooling fan 13, and FIG. 18B is a sectional view (corresponding to a side view of the rotor core 71) of a G-G section of FIG. 18A. An assembly composed of the rotor 70 and the cooling fan 13 is configured to include: the rotation shaft 60 being a central axis; the substantially cylindrical rotor core 71, disposed around the rotation shaft 60; and the cooling fan 13, fixed concentrically with the rotation shaft 60 on the front side of the rotor core 71. The rotation shaft 60 is axially supported by the bearings 15a and 15b (see FIG. 1) in two places in the front-back direction, in which bearing holding parts 60b and 60e are formed whose outer peripheral surfaces are polished and coaxiality is improved in order for the bearings to be pressed into attachment parts of the bearings 15a and 15b. A small-diameter part 60a for holding the bevel gear 7a (see FIG. 1) is formed on the front side of the bearing holding part 60b. A cooling fan attachment part 60c, in which a concave-convex part 60f continuous in the circumferential direction is formed, is formed on a part of an outer peripheral surface in the axial direction on the back side of the bearing holding part 60b. The cooling fan 13 fixed to the cooling fan attachment part 60c is a centrifugal fan. By rotation of the cooling fan 13, the air taken in from the back side of the rotation shaft 60 in the axial direction is discharged radially outward. The cooling fan 13 is manufactured by integral molding of synthetic resin. On the inner peripheral side, an attachment part 13a as a concave-convex part of a shape corresponding to that of the concave-convex part 60f is formed, and the cooling fan 13 is fixed to the rotation shaft 60 so that no idle running occurs by pressing the attachment part 13a into the concave-convex part 60f.

The rotor core 71 is composed of a laminated iron core in which multiple steel plates are laminated. A portion of the rotation shaft 60 that holds the rotor core 71 is a shaft mold part 60d whose outer peripheral surface is covered with a mold member 65 made of an insulating material. A resin is used as the mold member 65. By fixing the rotor core 71 to the shaft mold part 60d, since metal portions of the rotation shaft 60 and the rotor core 71 are connected via the mold member 65, an electrically non-conductive state is achieved. Balancer members 85 and 95 are coaxially provided at a front end and a back end of the rotor core 71 to achieve rotational balance. The balancer members 85 and 95 are annular mass bodies made of nonmagnetic metal and having a predetermined thickness in the direction of the rotation shaft. By forming predetermined drill holes, grooves, chamfers or the like in the radial direction in one or more places on the outer peripheral surface in the circumferential direction and reducing local mass, accuracy of the rotational balance of a rotating body shown in FIG. 18A is improved. In FIG. 18A, small grooves continuous in the circumferential direction are formed in the positions indicated by arrows 85a and 95a. These small grooves are provided to facilitate determination of the position of a drill tip in the axial direction during drilling. Accordingly, the circumferential grooves 85a and 95a may not be provided.

In the present embodiment, a disc-shaped resin spacer 80 is interposed between the balancer member 85 and a front end surface 71a of the rotor core 71, and a disc-shaped resin spacer 90 is interposed between the balancer member 95 and a back end surface 71b of the rotor core 71. The resin spacers 80 and 90 have almost the same outer diameter as that of the rotor core 71, and have a smaller thickness in the axial direction than that of the balancer members 85 and 95. In the present embodiment, the outer diameter of a spacer member (the resin spacers 80 and 90) is slightly smaller than an outer diameter D of the rotor core 71 by ti, and ti is about 0.5 mm in contrast with that the outer diameter D of the rotor core 71 is 39.8 mm. On the other hand, a diameter $D_{80}$ of the balancer member 85 with respect to the rotor core 71 is configured to be about 15% smaller, and a diameter $D_{90}$ of the balancer member 95 with respect to the rotor core 71 is configured to be about 30% smaller.

FIG. 18B corresponds to a front view of an end surface of the rotor core 71 as viewed from the front side. Slots 73a to 73d, which are obtained by cutting out laminated iron cores at equal intervals in the circumferential direction, are formed in the rotor core 71. The slots 73a to 73d are disposed so as to be respectively located on the four sides of a square centered on the rotation shaft 60 in a cross section of the rotor core 71. Inside the slots 73a to 73d, four platelike magnets 76a to 76d in the direction of the rotation axis A1 are inserted in the direction of the rotation axis A1 and are fixed with an adhesive. Small-diameter parts 75a to 75d continuous in the axial direction are rivets for positioning when fixing a large number of steel plates that constitute the rotor core 71. Herein, on an outer peripheral surface 71c of the rotor core 71, in the vicinity where short sides of each of the magnets 76a to 76d approach each other, V-shaped grooves 74a to 74d are formed so that the outer peripheral surface of the rotor core 71 is recessed radially inward in a substantial V shape or in a valley shape.

The V-shaped grooves 74a to 74d are axial grooves formed continuously from the front end surface 71a to the back end surface 71b over the entire length of the rotor core 71 in the axial direction. Even though the sectional shape of the axial grooves is a substantial V shape, it can be said to be a substantial U shape because its bottom portion is planar or curved. By forming such valley-shaped grooves over the entire length of the rotor core 71 in the axial direction, the cooling air is likely to pass on the outer peripheral side of the rotor core 71, the magnetic characteristics by the magnets 76a to 76d can be improved and disturbance of magnetic flux generated from the rotor core 71 can be reduced. On the outer peripheral side of the rotation shaft 60, the mold member 65 is interposed between the rotation shaft 60 and a center hole 72 of the rotor core 71. The mold member 65 is formed only on a specific portion on the outer peripheral side of the rotation shaft 60, that is, the shaft mold part 60d (see FIG. 18A), and has a predetermined thickness in the radial direction. By interposing the mold member 65 in this way, the rotor core 71 and the rotation shaft 60 are electrically insulated.

Figure 19A:
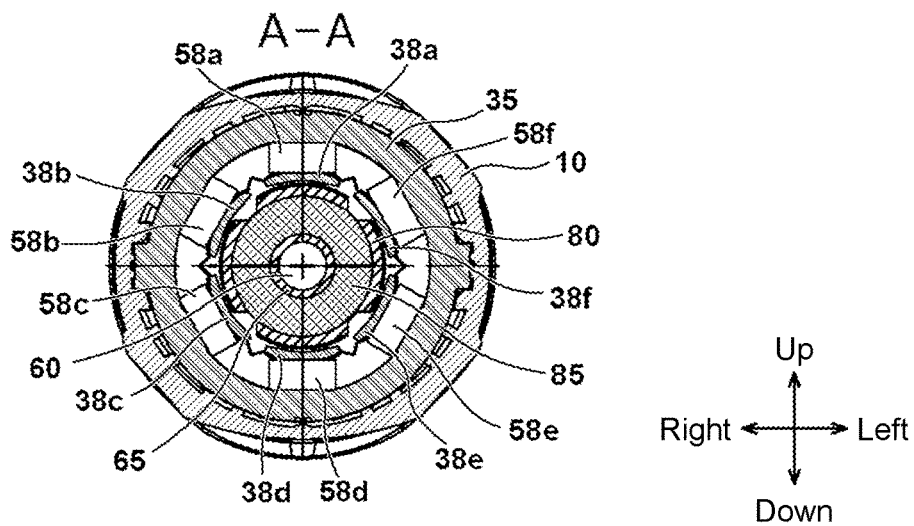
FIG. 19A is a sectional view of an A-A section of FIG. 3.
Figure 19B:
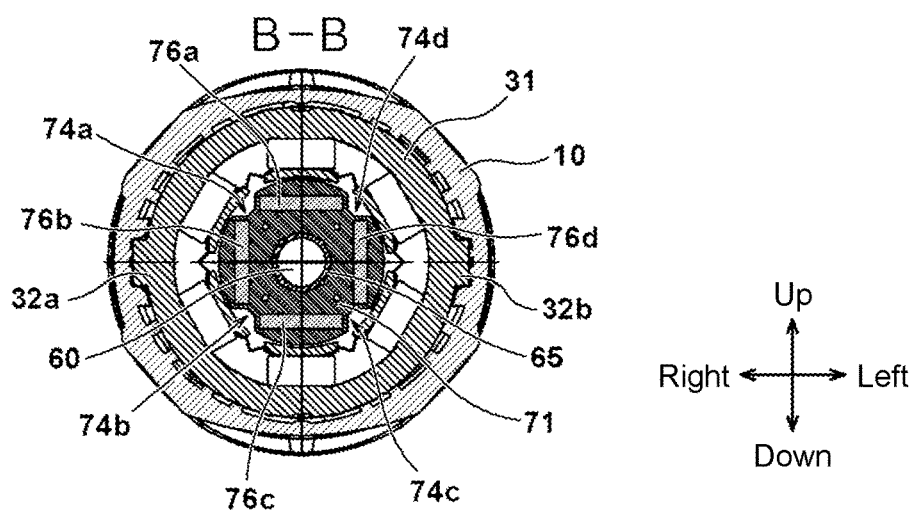
FIG. 19B is a sectional view of a B-B section of FIG. 3.
Figure 19C:
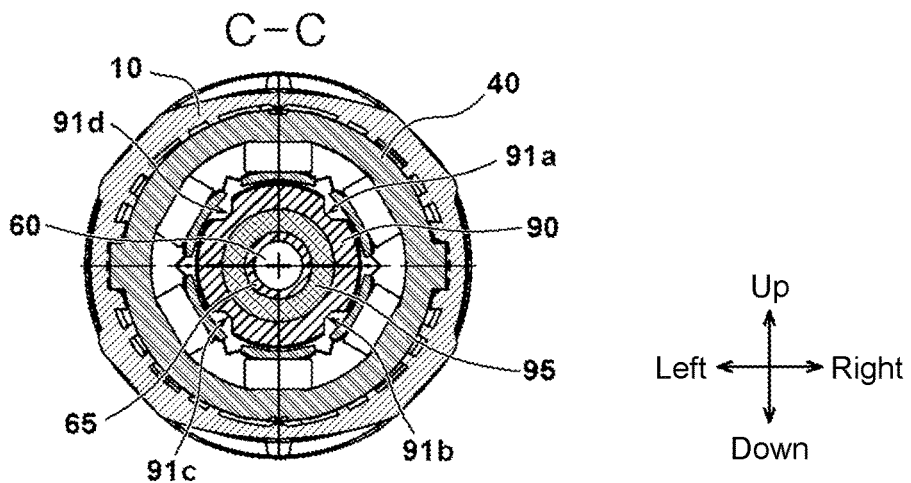
FIG. 19C is a sectional view of a C-C section of FIG. 3.

FIG. 19A is a sectional view of an A-A section of FIG. 3, FIG. 19B is a sectional view of a B-B section of FIG. 3, and FIG. 19C is a sectional view of a C-C section of FIG. 3. Herein, FIG. 19A and FIG. 19B are diagrams as viewed from the front in the direction of the rotation axis A1, and FIG. 19C is a diagram as viewed from the back side in the direction of the rotation axis A1. Thus, it is to be noted that the orientations of the left-right direction are different. As shown in the sectional view of FIG. 19B, the stator core 31 has six pole pieces inward, and the rotor core 71 is disposed in an inner space of the pole pieces. An outer peripheral surface of the rotor core 71 is adjacent to the pole pieces of the stator core 31 so that a small gap is formed therebetween. The motor housing 10 holding the stator core 31 is formed into a cylindrical shape by integral molding of synthetic resin, and does not have a division surface that passes through the rotation shaft 60 in the axial direction. The stator core 31 is assembled by being inserted from the front side to the back side in the axial direction of the motor housing 10. A large number of ribs (convex parts) continuous in the axial direction are formed inside the motor housing 10, and a predetermined axial passage is formed outside the stator core 31. In the present embodiment, since the labyrinth space 39 (see FIG. 12) is formed, the cooling air that flows from the back side to the front side in the axial direction on the outer peripheral side of the motor 5 is suppressed. In addition, since the keys 32a and 32b of the stator core 31 are located in the concave parts (key grooves) formed in the motor housing 10, the motor 5 is held in the motor housing 10 so as not to move in the rotational direction.

The A-A section in FIG. 19A corresponds to a side view of the rotor 70 as viewed from the front side. The resin spacer 80 having the same sectional outer edge shape as that of the rotor core 71 (see FIG. 18A and FIG. 18B) having a V-shaped section is provided on the front end surface (leeward end) of the rotor core 71, and on the front side thereof, the balancer member 85 having a diameter substantially equal to the diameter of the bottom of the V-shaped grooves 74a to 74d of the rotor core 71 is provided. In this way, by disposing the resin spacer 80 having the same shape as the rotor core 71 having a V-shaped section between the balancer member 85 and the rotor core 71, a metal surface of the front end surface 71a (see FIG. 18A) of the rotor core 71 can be kept unexposed. In addition, by disposing the balancer member 85 of a small diameter on the front side of the resin spacer 80, the rotational balance can be adjusted in the same manner as conventionally. The outer diameter of the balancer member 85 may be formed to be the same as or smaller than that of the bottom (the closest point to the rotation shaft center) of the V-shaped grooves 74a to 74d of the rotor core 71, and may further be formed to be smaller than a position of an outside surface of a permanent magnet passing through the rotation shaft 60 as viewed in the normal direction of the permanent magnet. By formation in this way, the cooling air flowing through the V-shaped grooves 74a to 74d from the back side to the front side in the axial direction may smoothly flow without being hindered by the resin spacer 80. In particular, since the balancer member 85 is on the leeward side of the rotor core 71, if the outer diameter of the balancer member 85 is larger than that of the bottom of the V-shaped grooves 74a to 74d, dust may accumulate in a space surrounded by the balancer member 85 and the rotor core 71 and may be difficult to remove even with an airflow generated by the cooling fan 13. However, according to the present invention, it is possible to suppress the accumulation of dust on the leeward side of the rotor core 71. The insulator 35 is provided on the front end side of the rotor core 71, and coils 58a to 58f are formed on a winding part of the insulator 35 extending in the radial direction. In FIG. 19A to FIG. 19C, detailed illustration of the coil portions composed of enamel wires are omitted, and the portions occupied by the coils are shown as rectangles. In addition, a coil is wound around each magnetic pole portion of the stator core 31 via a third insulator while keeping a non-contact state with the magnetic pole portion. However, in FIG. 19A to FIG. 19C, the third insulator is also omitted from illustration.

FIG. 19C is a diagram corresponding to a back view of the rotor 70 as viewed from the back side. As is clear from this figure, the size of the balancer member 95 is set to a diameter sufficiently smaller than that of the rotor core 71 or the resin spacer 90. If the balancer member 95 is reduced in size in this way, on an outer peripheral side of the balancer member 95, the sensor substrate 122 (see FIG. 3) mounted with the Hall ICs that detect a rotational position of the rotor core 71 can be disposed, and the space on the outer peripheral side of the balancer member 95 can be effectively used. On the other hand, since V-shaped grooves 91a to 91d are formed so that an outer edge shape of the resin spacer 90 is the same as that of the rotor core 71, a metal surface of the back end surface 71b (see FIG. 18A) of the rotor core 71 can be made unexposed, and metal dust that has reached an internal space of the motor housing 10 together with the cooling air from the handle housing 45 can be prevented from directly adhering to the back end surface 71b of the rotor core 71 in the axial direction. In addition, since a V-shaped groove is similarly formed in the resin spacer 90, a risk of causing motor lock due to foreign matter attached to an end surface of the rotor core 71 can be largely avoided without hindering the flow of the cooling air in the axial direction.

In this way, in the present embodiment, intrusion of metal dust can be suppressed by the filter member 150. Even if metal dust intrudes into the motor housing, by devising the shape of the balancer member 95 or the resin spacer 90, the metal dust can be suppressed from adhering to the rotor core 71. In addition, since the cooling air concentratedly flows to the inner space of the stator 30, that is, around the rotor core 71, due to the shape of the fan guide 50 and the insulator 35, even if metal dust adheres to the rotor core 71, the metal dust can be blown off by wind and be discharged outside. That is, the impact of the metal dust on work can be suitably suppressed.

The present invention has been described above based on the embodiments. However, the present invention is not limited to the above embodiments, and various modifications can be made without departing from the spirit of the present invention. For example, the electric tool is not limited to the grinder described above, and may be applied in other various power tools using a motor. In addition, if it is a motor apparatus in which a power transmission part is connected to a rotation shaft extending to the other end side of the motor, the electric tool can be applied in other power machines or motors for power machines.

What is claimed is:
1. An electric tool, having:
   a motor, having a stator, a rotor located inside the stator, and a rotation shaft extending from one side to an other side;
   a motor housing of a cylindrical shape, accommodating and supporting the motor;
   a cooling fan, attached to the rotation shaft of the motor and rotating in synchronization with the motor; and
   a power transmission mechanism, transmitting a rotational force of the motor to a tip tool, wherein the motor is cooled by flowing an air generated by the cooling fan from an opening on one side of the motor housing toward an opening on the other side of the motor housing, wherein the stator has a nonmagnetic insulator at one side of the stator, and a fan guide is provided, guiding a cooling air generated by the cooling fan from an intake port to an exhaust port, and the fan guide has a first cylindrical part, a guide surface connected to the first cylindrical part, and a second cylindrical part connected to the guide surface, and guides the cooling air to concentrate inside the stator, and an end portion provided at one side of the second cylindrical part is located on one side of an opening surface provided on the other side of the insulator.

2. The electric tool as claimed in claim 1, having:

a handle housing, connected to one side of the motor housing, in which a grip is formed;

a gear case, connected to the other side of the motor housing; and a drive circuit, mounted with a switching element and driving the motor, wherein the intake port is provided in the handle housing, the exhaust port is provided in the gear case, when the cooling fan rotates, the air is sucked into the handle housing from the intake port, the air passes through inside of the motor housing, cools the drive circuit and then cools the motor, and is discharged outside from the exhaust port.

3. The electric tool as claimed in claim 1, wherein and the fan guide guides the cooling air by engaging with the insulator in a concavo-convex manner in an axial direction.

4. The electric tool as claimed in claim 3, wherein the concavo-convex engagement comprises the second cylindrical part continuous in a circumferential direction on one side of the fan guide, and a circumferential groove formed on an other side of the insulator and continuous in the circumferential direction, and the cylindrical part and the circumferential groove are disposed so as to overlap each other in a non-contact state in the axial direction of the motor.

5. The electric tool as claimed in claim 1, wherein the fan guide has an abutment part abutting against an end surface of a stator core of the stator, and the abutment part suppresses the stator from moving in the axial direction.

6. The electric tool as claimed in claim 5, wherein the abutment part is a convex part extending in the axial direction from a plurality of places in the fan guide in the circumferential direction, and the convex part abuts against the stator core.

7. The electric tool as claimed in claim 1, wherein the intake port, the exhaust port and the motor are separated from each other in the axial direction of the motor, and the motor is located between the intake port and the exhaust port.

8. The electric tool as claimed in claim 1, wherein in the rotor, a plurality of slots continuous in a direction of the rotation shaft are provided in a rotor core composed of a laminated iron core attached to the rotation shaft and a permanent magnet is accommodated, wherein on an outer peripheral surface of the rotor core, a concave part recessed inward is formed so as to be continuous in the axial direction, and the cooling air passes through inside the concave part.

9. An electric tool, having:

a motor;

a power conversion mechanism, driving a tip tool by rotation of the motor;

a fan, rotated by driving of the motor;

a housing, having an intake port and an exhaust port and accommodating the motor and the fan; and a filter member, provided at the intake port, wherein the filter member is attachable and detachable in an opening direction of the intake port, and has a locking part extending in a direction intersecting the opening direction of the intake port, and the locking part suppresses falling-off of the filter member by engaging with the housing, wherein the filter member has a flexible frame and a net held by the frame, and the frame is deformable by a pressing force in a direction opposite an extension direction of the locking part, and the frame is deformed when the filter member is attached to or detached from the intake port, wherein the filter member is held by a filter attachment frame provided so as to surround the intake port of the housing, if the pressing force on the frame is removed, the filter member does not protrude outside from a concave recess formed by the filter attachment frame, and when the frame is deformed, the filter member is able to protrude from the recess formed by the filter attachment frame.

10. The electric tool as claimed in claim 9, wherein the housing has a motor housing accommodating the motor, and a handle housing having a grip able to be gripped by an operator, wherein the intake port and the filter member are located between the motor and the grip.

11. The electric tool as claimed in claim 10, wherein the filter member forms a frame by casting an outer peripheral edge of a net made of a metal net in an elastic member, the frame is of a shape having two long side parts parallel to each other as viewed from the opening direction, wherein the locking part is formed so as to extend in a direction parallel to the net at the long side parts.

12. The electric tool as claimed in claim 11, wherein in the filter member, one end of the long side parts is linearly connected, the other end is connected by two sides having a corner, and an outer edge is substantially pentagonal in side view.

13. The electric tool as claimed in claim 11, wherein the motor housing is formed into a cylindrical shape by integral molding of synthetic resin and does not have a division surface.

14. An electric tool, having:

a motor;

a power conversion mechanism, driving a tip tool by rotation of the motor;

a fan, rotated by driving of the motor;

a housing, having an intake port and an exhaust port and accommodating the motor and the fan; and a filter member, provided at the intake port, wherein the filter member is attachable and detachable in an opening direction of the intake port, and has a locking part extending in a direction intersecting the opening direction of the intake port, and the locking part suppresses falling-off of the filter member by engaging with the housing, wherein the filter member forms a frame by casting an outer peripheral edge of a net made of a metal net in an elastic member, and the frame is of a shape having two short side parts and two long side parts, wherein the two long side parts are parallel to each other as viewed from the opening direction, wherein the locking part is formed so as to extend in a direction parallel to the net at the long side parts.

\* \* \* \* \*